(12) United States Patent
Ueda

(10) Patent No.: US 6,508,556 B1
(45) Date of Patent: Jan. 21, 2003

(54) PROJECTION DISPLAY APPARATUS

(75) Inventor: Mitsugu Ueda, Tokyo (JP)

(73) Assignee: Mitsubishi Denski Kabushiki Kaisha, Tokyo (JP)

( * ) Notice: Subject to any disclaimer, the term of this patent is extended or adjusted under 35 U.S.C. 154(b) by 38 days.

(21) Appl. No.: 09/694,811

(22) Filed: Oct. 24, 2000

(30) Foreign Application Priority Data

May 23, 2000 (JP) ........................................ 2000-151485

(51) Int. Cl.[7] .................... G03B 21/22; G03B 21/14; G03B 21/20; F21V 21/00; F21S 8/08
(52) U.S. Cl. .................... 353/74; 353/86; 353/87; 353/119; 362/396; 362/406; 362/412; 362/452; 362/458
(58) Field of Search .................... 353/74, 119, 87, 353/86, 85; 362/396, 406, 412, 452, 458

(56) References Cited

U.S. PATENT DOCUMENTS

| 5,722,753 A | * | 3/1998 | Okada et al. ............... 353/119 |
| 5,857,766 A | * | 1/1999 | Sieczkowski ............... 362/365 |
| 5,978,051 A | * | 11/1999 | Gohman et al. ............ 348/766 |
| 6,309,074 B1 | * | 10/2001 | Inbar et al. ................. 353/120 |

FOREIGN PATENT DOCUMENTS

JP  A1172844  3/1999

* cited by examiner

*Primary Examiner*—Russell Adams
*Assistant Examiner*—Magda Cruz
(74) *Attorney, Agent, or Firm*—Birch, Stewart, Kolasch & Birch, LLP

(57) ABSTRACT

Disclosed is a projection display apparatus in which the optical axis of a lamp and that of an optical unit can be easily made coincide with each other irrespective of dimensional variations of component parts. A lamp holder (32) is movably attached to a ride side plate (37) of a lamp case by extension springs (63). The center of a lamp (1) is positioned on the optical axis (20x) of an optical unit (20) by a circular arc wall face (32f) of the lamp holder (32) and a V-shaped member (45) fixed to the optical unit (20). The optical axis (1x) of the lamp (1) and the optical axis (20x) of the optical unit (20) are set to be parallel to each other by a slide reference face (20a) of the optical unit (20) and three projections of the lamp holder (32). Since the lamp holder (32) is not fixed to a lamp house, an influence of accumulation of dimensional variations of components such as the lamp house exerted on the adjustment of the optical axes of the lamp (1) and the optical unit (20) can be minimized.

12 Claims, 19 Drawing Sheets

PROJECTION DISPLAY APPARATUS

BACKGROUND OF THE INVENTION

1. Field of the Invention

The present invention relates to a projection display apparatus applied to a DMD (Digital Micromirror Device) projector, a liquid crystal projector, or the like, that projects an enlarged image onto a screen.

2. Description of the Background Art

Each of a DMD projector, a liquid crystal projector and the like has therein a projection display apparatus for projecting an enlarged image through a projection lens onto a screen. FIG. 19 is a perspective view partially showing the construction of a conventional projection display apparatus.

The projection display apparatus is constructed by fitting a lamp house 13 by insertion in which a lamp 1 as a light source is disposed into a lamp case 14. The face of each of the corners of side plates 15 of the lamp house 13 is formed as an inclined portion 15a and the remaining flat face is used as a contact portion 15b. In the case of fitting the lamp house 13 into the lamp case 14 by insertion, the contact portion 15b of the lamp case 14 is allowed to slide on an inner wall of the lamp case 14. In such a manner, the lamp house 13 is enclosed in the lamp case 14 and light of a predetermined quantity is distributed from the lamp 1.

In projection display apparatuses, in order to increase lamp efficiency, it is important to make the optical axis of the lamp 1 and that of an optical unit including the lamp case 14 coincide (align) with each other. The conventional projection display apparatus is, therefore, designed so that the optical axis of the lamp 1 and that of the optical unit coincide with each other when the lamp house 13 is fit to the lamp case 14 by insertion.

It is, however, extremely difficult to manufacture the parts constructing the lamp house 13 and the lamp case 14 strictly to the design dimensions. Generally, each of the component parts is finished within the range of a predetermined dimensional tolerance (range of the difference between the permissible maximum and minimum dimensions). As a result, in the conventional projection display apparatus, dimensional variations within the dimensional tolerance range of the parts constructing the lamp house 13 and the lamp case 14 are accumulated, and it is extremely difficult to make the optical axis of the lamp 1 and that of the optical unit coincide with each other with accuracy.

In order to supply electric power from a power source (not shown) to the lamp 1, a connector (not shown) for power supply is connected to each of the lamp house 13 and the lamp case 14. In the case of fitting the lamp house 13 into the lamp case 14 by insertion, the connectors provided for the lamp house 13 and the lamp case 14 have to be connected to each other. In the case of manufacturing the lamp house 13 and the lamp case 14, therefore, a positioning mechanism by which the connectors are properly connected to each other has to be provided. Due to an influence of the positioning mechanism for connecting the connectors, a problem such that the optical axis of the lamp 1 and that of the optical unit are further deviated from each other when the lamp house 13 is fitted into the lamp case 14 by insertion occurs.

SUMMARY OF THE INVENTION

A first aspect of the present invention is intended for a projection display apparatus for projecting an enlarged image onto a screen. According to the present invention, the apparatus comprises: an optical unit having a projection lens for projecting an enlarged image; a lamp case fixed to the optical unit; a lamp house in which a lamp holder to which a lamp for distributing light to the optical unit is fixed is movably disposed and which is detachably attached to the lamp case; lamp position regulating means for regulating a position of the lamp holder when the lamp house is attached to the lamp case, thereby positioning a center of the lamp onto an optical axis of the optical unit; and lamp posture regulating means for regulating a posture of the lamp holder when the lamp house is attached to the lamp case, thereby making an optical axis of the lamp and an optical axis of the optical unit parallel to each other.

Preferably, according to a second aspect of the present invention, the lamp holder has a circular arc wall face having a circular arc shape in cross section, a central axis of the circular arc wall face coinciding with the optical axis of the lamp; the lamp position regulating means is a V-shaped member having a V-shaped wall face which circumscribes the circular arc wall face at two points when the lamp house is attached to the lamp case; and the V-shaped member is fixed to the optical unit so that a point of intersection of two straight lines which pass through circumscribing points at which the V-shaped member circumscribes the circular arc wall face and are perpendicular to tangential lines at circumscribing points is positioned on an optical axis of the optical unit.

Preferably, according to a third aspect of the present invention, the optical unit has a reference face which is perpendicular to the optical axis of the optical unit, the lamp posture regulating means includes three or more projecting members each of which comes into contact with the reference face when the lamp house is attached to the lamp case, and the three or more projecting members are fixed to the lamp holder so that a flat face defined by the projecting members is perpendicular to the optical axis of the lamp.

Preferably, according to a fourth aspect of the present invention, the projection display apparatus further comprises an elastic member for generating a component force for pressing the circular arc wall face against the V-shaped member and a component force for pressing the three or more projecting members against the reference face.

Preferably, according to a fifth aspect of the present invention, a first connector for supplying electric power to the lamp is fixed to the lamp case, a second connector for supplying electric power to the lamp when being connected to the first connector is fixed to the lamp house, and the first and second connectors are connected to each other by making a guided member fixed to the lamp house slide along a guide member fixed to the lamp case.

Preferably, according to a sixth aspect of the present invention, the optical unit has therein a DMD chip and the projection lens enlarges and projects an image from the DMD chip.

Preferably, according to a seventh aspect of the present invention, the optical unit has therein a liquid crystal panel and the projection lens enlarges and projects an image from the liquid crystal panel.

As described above, according to the first aspect of the present invention, a projection display apparatus for projecting an enlarged image onto a screen, comprises: an optical unit having a projection lens for projecting an enlarged image, a lamp case fixed to the optical unit; a lamp house in which a lamp holder to which a lamp for distributing light to the optical unit is fixed is movably disposed and which is detachably attached to the lamp case; lamp position regulating means for regulating a position of the lamp holder when the lamp house is attached to the lamp case, thereby positioning a center of the lamp onto an optical axis of the optical unit; and lamp posture regulating means for regulating a posture of the lamp holder when the lamp house is attached to the lamp case, thereby making an optical axis of the lamp and an optical axis of the optical unit parallel to each other. Consequently, an influence by accumulation of dimensional variations of the component parts of the lamp house and the lamp case can be minimized. The optical axes of the lamp and the optical unit can be easily made coincide with each other irrespective of the dimensional variations of the component parts.

According to a second aspect of the present invention, the lamp holder has a circular arc wall face having a circular arc shape in cross section, a central axis of the circular arc wall face coinciding with the optical axis of the lamp; the lamp position regulating means is a V-shaped member having a V-shaped wall face which circumscribes the circular arc wall face at two points when the lamp house is attached to the lamp case; and the V-shaped member is fixed to the optical unit so that a point of intersection of two straight lines which pass through circumscribing points at which the V-shaped member circumscribes the circular arc wall face and are perpendicular to tangential lines at circumscribing points is positioned on an optical axis of the optical unit. Thus, the center of the lamp can be certainly positioned onto the optical axis of the optical unit, and the optical axes of the lamp and the optical unit can be easily made coincide with each other.

According to a third aspect of the present invention, the optical unit has a reference face which is perpendicular to the optical axis of the optical unit, the lamp posture regulating means includes three or more projecting members each of which comes into contact with the reference face when the lamp house is attached to the lamp case, and the three or more projecting members are fixed to the lamp holder so that a flat face defined by the projecting members is perpendicular to the optical axis of the lamp. Consequently, the optical axes of the lamp and the optical unit can be certainly made parallel to each other, and the optical axes of the lamp and the optical unit can be easily made coincide with each other irrespective of dimensional variations of the component parts.

According to a fourth aspect of the present invention, the projection display apparatus further comprises an elastic member for generating a component force for pressing the circular arc wall face against the V-shaped member and a component force for pressing the three or more projecting members against the reference face. The V-shaped member can stably circumscribe the circular arc wall face and the three or more projecting members are stably in contact with the reference face. Consequently, the optical axes of the lamp and the optical unit can be made coincide with each other with higher accuracy.

According to a fifth aspect of the present invention, a first connector for supplying electric power to the lamp is fixed to the lamp case, a second connector for supplying electric power to the lamp when being connected to the first connector is fixed to the lamp house, and the first and second connectors are connected to each other by making a guided member to be guided fixed to the lamp house slide along a guide member fixed to the lamp case. Consequently, the positioning for connecting the connectors and the adjustment of the optical axes of the lamp and the optical unit can be performed independent of each other. Thus, the optical axes of the lamp and the optical unit can be easily made coincide with each other without being influenced by the positioning mechanism for connecting the connectors.

It is therefore an object of the present invention to provide a projection display apparatus in which the optical axis of a lamp and that of an optical unit can be easily made coincide with each other irrespective of dimensional variations in the component parts.

Another object of the invention is to provide a projection display apparatus in which the optical axis of a lamp and that of an optical unit can be easily made coincide with each other without being influenced by a positioning mechanism for connecting connectors.

These and other objects, features, aspects and advantages of the present invention will become more apparent form the following detailed description of the present invention when taken in conjunction with the accompanying drawings.

DESCRIPTION OF THE PREFERRED EMBODIMENTS

Figure 1:
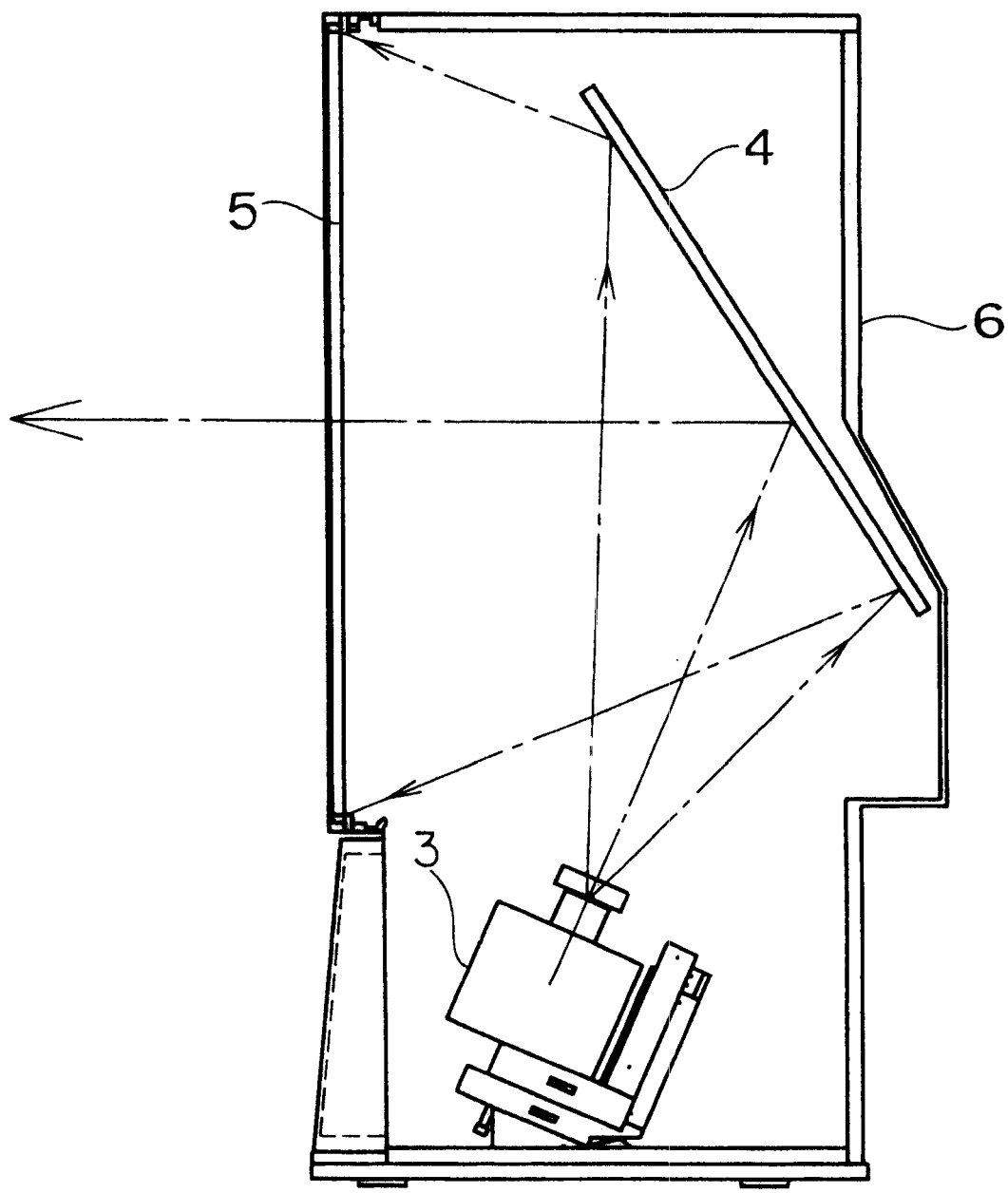
FIG. 1 shows a schematic construction of a DMD projector having therein a projection display apparatus according to the present invention.

Preferred embodiments of the present invention will be described in detail hereinbelow with reference to the drawings. FIG. 1 shows a schematic construction of a DMD projector having therein a projection display apparatus 3 according to the present invention. In a cabinet 6, the projection display apparatus 3 having therein a DMD (Digital Micromirror Device) and a reflection mirror 4 are disposed. A screen 5 is disposed on the front face of the cabinet 6. As shown in the drawing, the projection display apparatus 3 emits light shown by alternate long and short dash lines, which is totally reflected by the reflecting mirror 4 onto the screen 5, so that an enlarged predetermined image is projected onto the screen 5. The reason why the optical path is reflected by the reflecting mirror 4 is to make the entire DMD projector compact.

Figure 2:
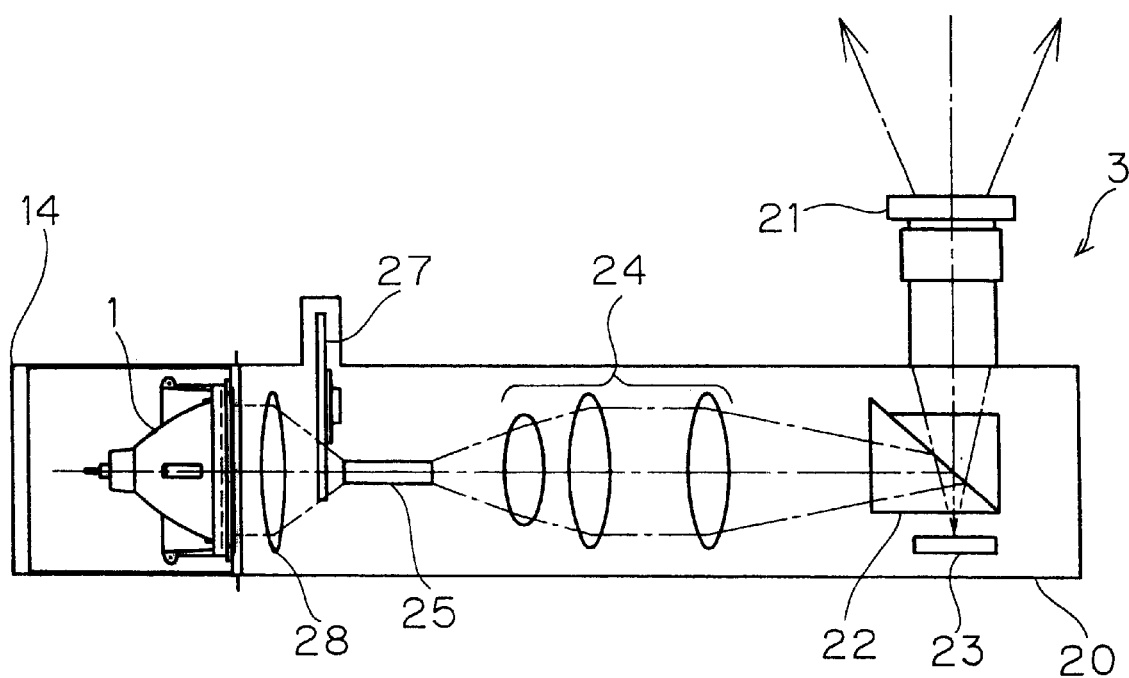
FIG. 2 shows a schematic construction of the projection display apparatus according to the present invention.
Figure 3:
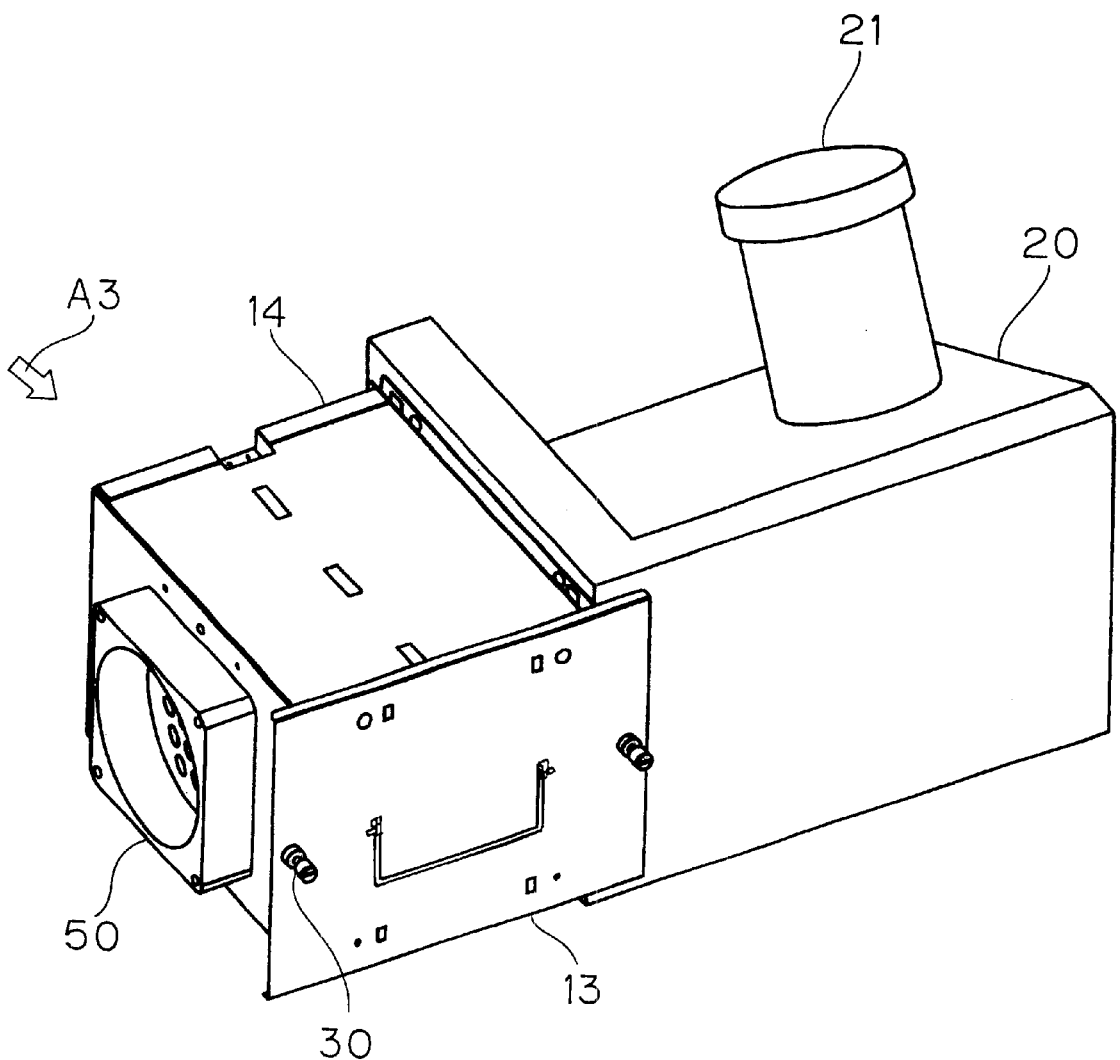
FIG. 3 is a perspective view of the whole projection display apparatus of FIG. 2.
Figure 4:
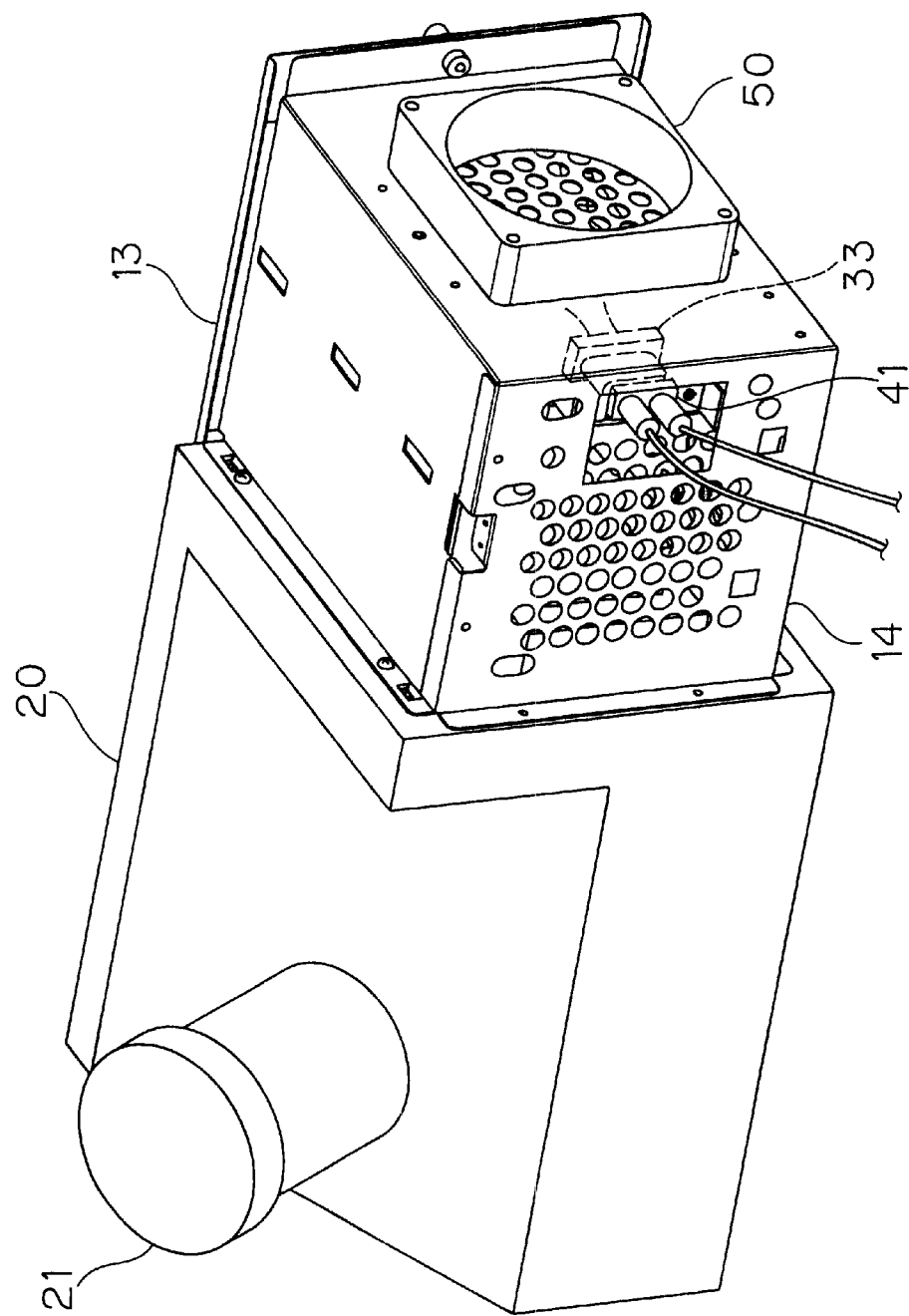
FIG. 4 is a perspective view of the whole projection display apparatus of FIG. 2.

FIG. 2 shows a schematic construction of the projection display apparatus 3 according to the present invention. Each of FIGS. 3 and 4 is a perspective view of the whole projection display apparatus 3. FIG. 4 is a perspective view when the projection display apparatus 3 is seen from the direction of an arrow A3 in FIG. 3. The projection display apparatus 3 is provided in the DMD projector of FIG. 1 and has an optical unit 20 and the lamp case 14. In the casing, the optical unit 20 includes: a condenser lens 28 for condensing light; a color wheel 27 in which color filters for green, red and blue are arranged; a mixing rod 25; a relay lens 24; a total internal reflection prism 22; and a DMD chip 23. The optical unit 20 also has a projection lens 21 for projecting an enlarged image. The lamp case 14 is fixed to the optical unit 20. The lamp case 14 is a hollow casing and the lamp house 13 in which the lamp 1 is disposed is detachably attached. A cooling fan 50 is provided on an end face (face opposite to the face to which the optical unit 20 is attached) of the lamp case 14.

Light emitted from the lamp 1 in a state where the lamp house 13 is fitted in the lamp case 14 is condensed to one of the end faces of the mixing rod 25 by the condenser lens 28 as shown by alternate long and short dash lines in FIG. 2. In this case, since the color wheel 27 is disposed between the condenser lens 28 and the mixing rod 25, the light goes out from the condenser lens 28 passes through the color wheel 27, thereby time-sequentially arranging colors and condensing the light to the mixing rod 25.

The light incident on the mixing rod 25 is adjusted to a predetermined angle of view in the mixing rod 25 and goes out from the other end face of the mixing rod 25. The outgoing light from the mixing rod 25 passes through the relay lens 24, the optical path of the light is changed by the total internal reflection prism 22, and the resultant light is incident on the DMD chip 23.

The DMD chip 23 converts the emitted light to a digital output by rotating a number of micromirror. The light converted by the DMD chip 23 to the digital output is again incident on and passes through the total internal reflection prism 22 and is projected from the projection lens 21. The light projected from the projection lens 21 is totally reflected by the reflecting mirror 4 and is enlargedly projected onto the screen 5 (refer to FIG. 1).

Figure 5:
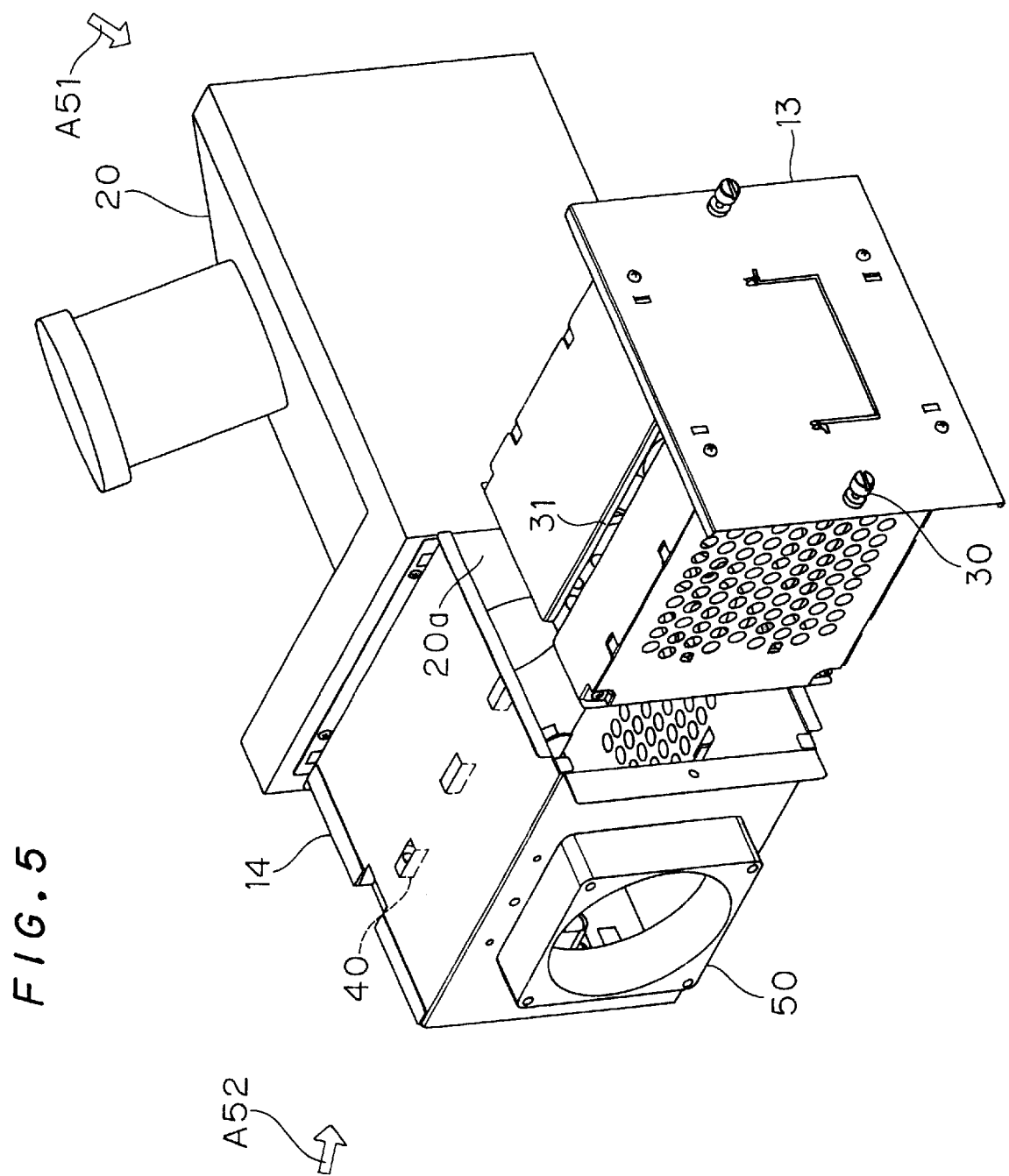
FIG. 5 is a perspective view of a projection display apparatus in which a lamp house is drawn from a lamp case.
Figure 6:
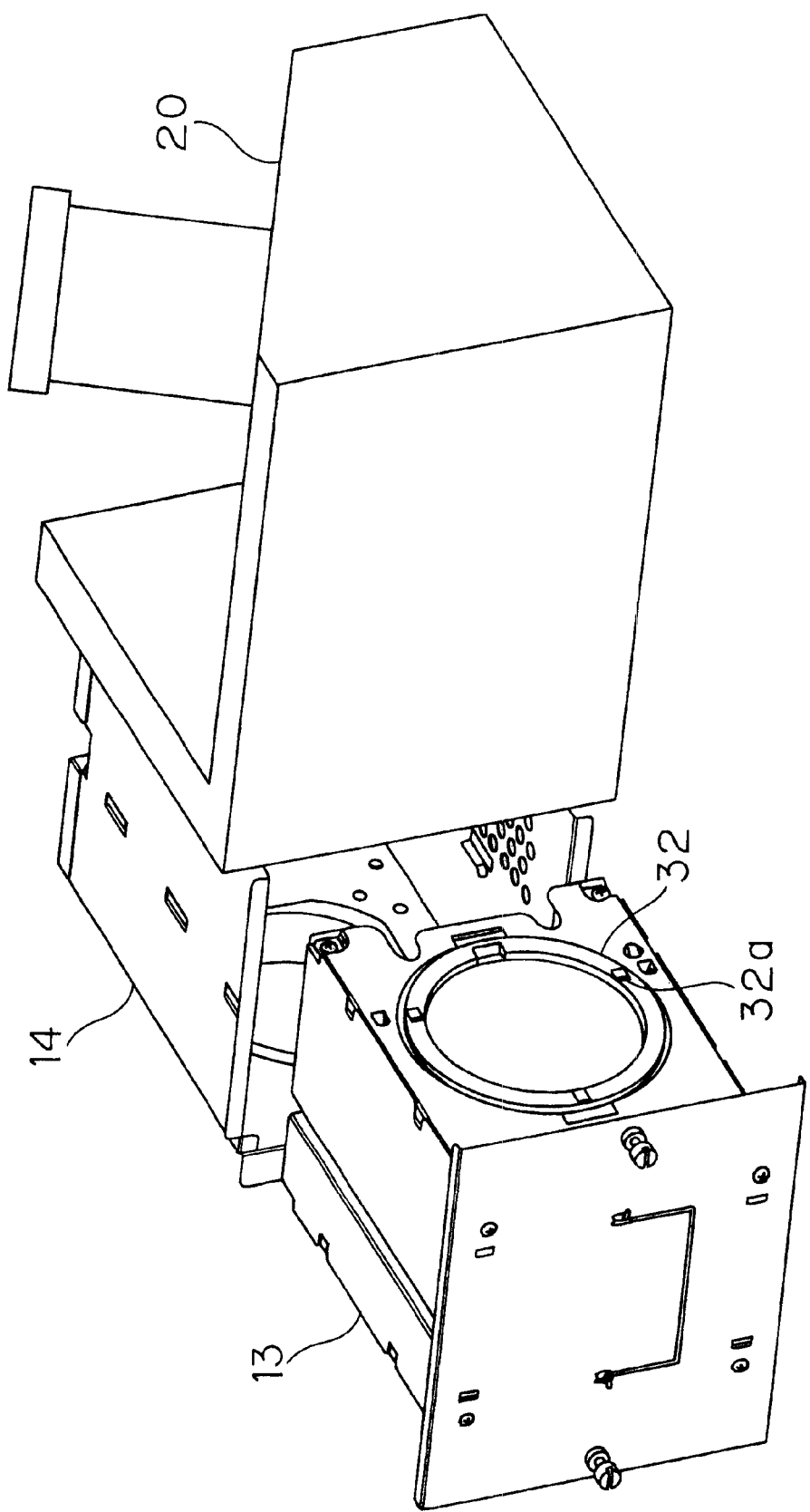
FIG. 6 is a perspective view of the projection display apparatus in which the lamp house is drawn from the lamp case.
Figure 7:
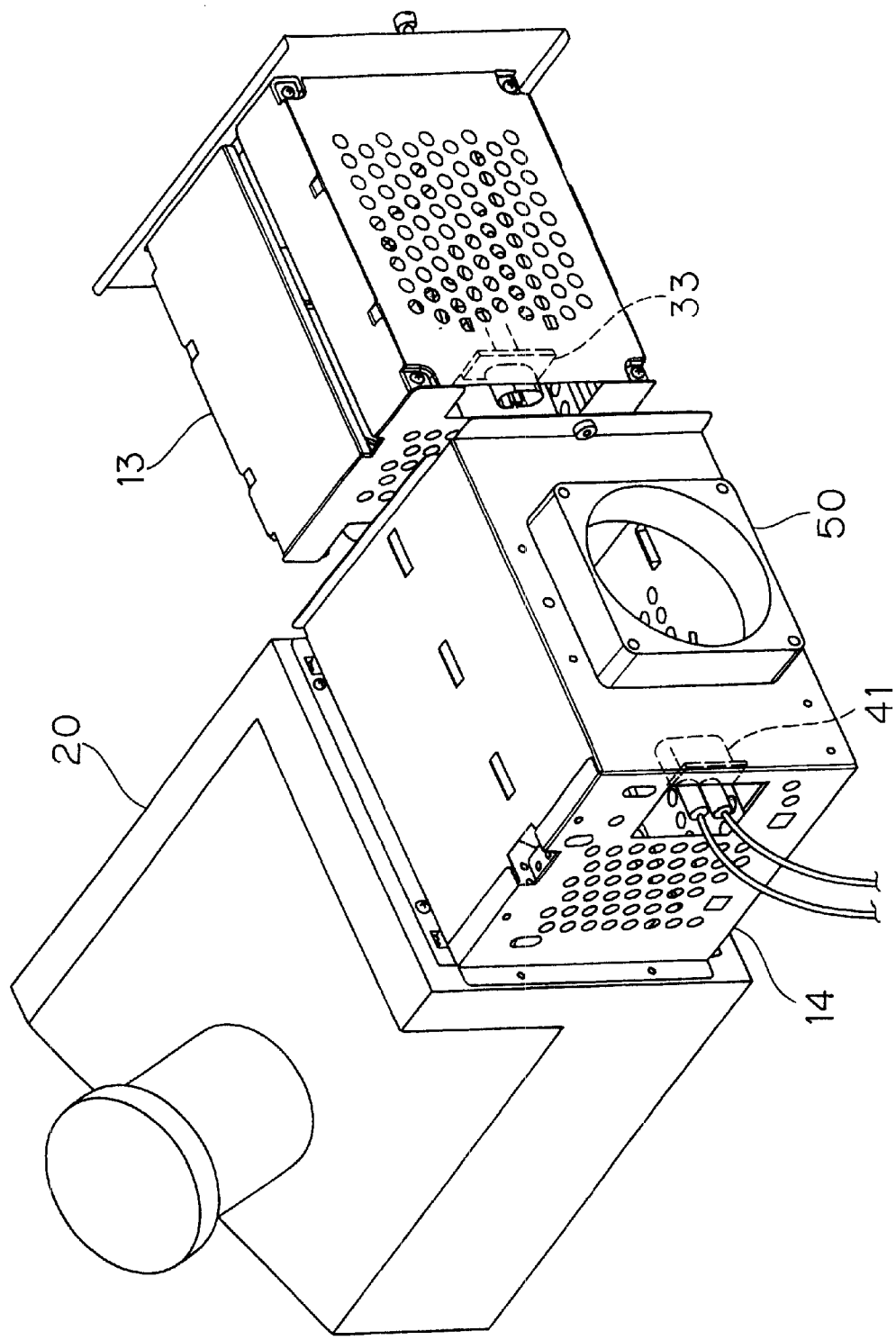
FIG. 7 is a perspective view of the projection display apparatus in which the lamp house is drawn from the lamp case.

Each of FIGS. 5 to 7 is a perspective view of the projection display apparatus 3 in which the lamp house 13 is drawn from the lamp case 14. FIGS. 6 and 7 are perspective views seen from directions of arrows A51 and A52 in FIG. 5, respectively. The lamp house 13 has a lamp holder 32 to which the lamp 1 for distributing light to the optical unit 20 is fixed in the casing.

Linear rails 31 are formed on the top and bottom faces of the lamp house 13. Three guide plates 40 are fixed on the inside of each of the top and bottom faces of the lamp case 14. When the lamp house 13 is fitted in the lamp case 14, the guide plates 40 are slidably fitted in the rails 31 as guided members.

A slide reference face 20a is formed on a side face of the optical unit 20 (side face to which the lamp case 14 is fixed). The slide reference face 20a is a smooth face perpendicular to the optical axis of the optical unit 20. On the other hand, three projections 32a are formed on a lamp holder 32 of the lamp house 13 (FIG. 6). When the lamp house 13 is fitted in the lamp case 14, each of the three projections 32a slidably comes into contact with the slide reference face 20a. That is, the lamp house 13 is fitted in the lamp case 14 so as to be sandwiched between the guide plate 40 and the slide reference face 20a. After the lamp house 13 is fitted in the lamp case 14 by insertion, the lamp house 13 is fixed to the lamp case 14 by mounting screws 30 (refer to FIG. 3).

A connector 41 for power supply is fixedly provided in the rear portion (portion opposite to the insertion port of the lamp house 13) of the lamp case 14 (refer to FIG. 7). The connector 41 for power supply is connected to a lamp power source circuit board (not shown). On the other hand, a lamp connector 33 is fixedly provided in the rear portion of the lamp house 13. The lamp connector 33 is wired to the lamp 1. When the lamp connector 33 is connected to the connector 41 for power supply, the lamp connector 33 can supply electric power to the lamp 1. When the lamp house 13 is fitted in the lamp case 14 by insertion, the guide plates 40 provided for the lamp case 14 slide along the rails 31 formed in the lamp house 13, thereby performing the positioning so that the connector 41 for power supply and the lamp connector 33 are properly connected to each other (refer to FIG. 4).

Figure 8:
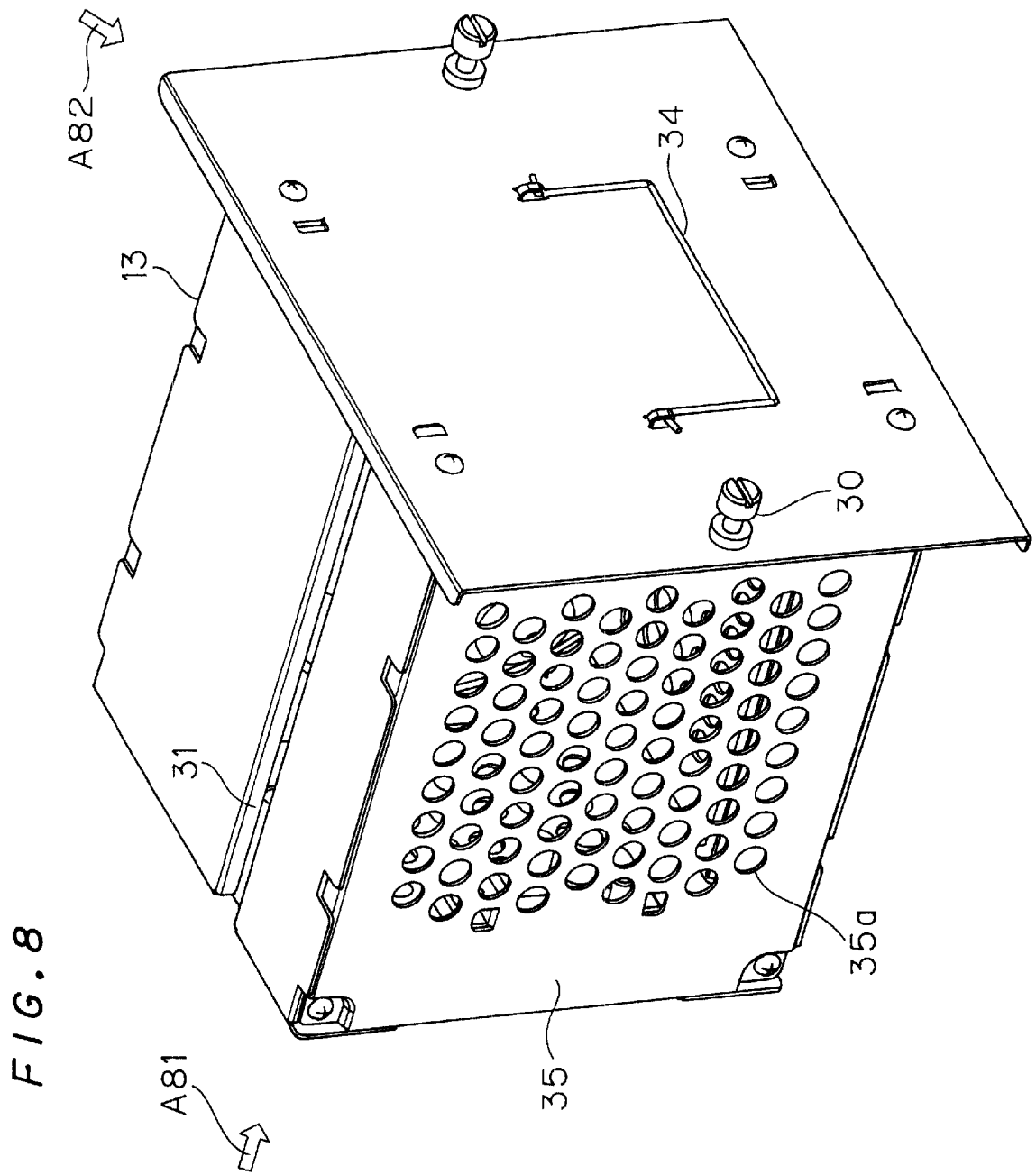
FIG. 8 is a perspective view showing the appearance of the lamp house.
Figure 9:
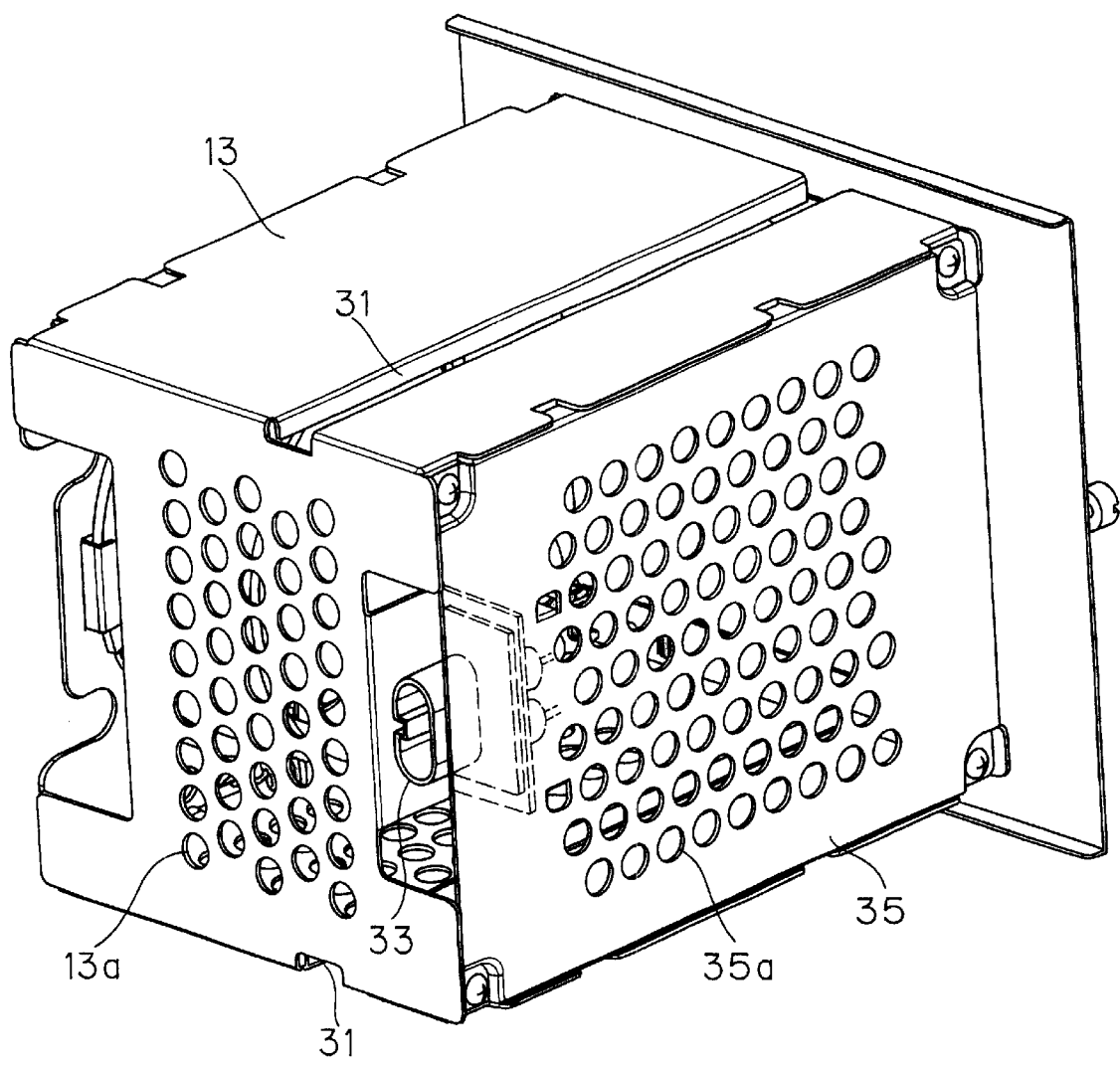
FIG. 9 is a perspective view showing the appearance of the lamp house.
Figure 10:
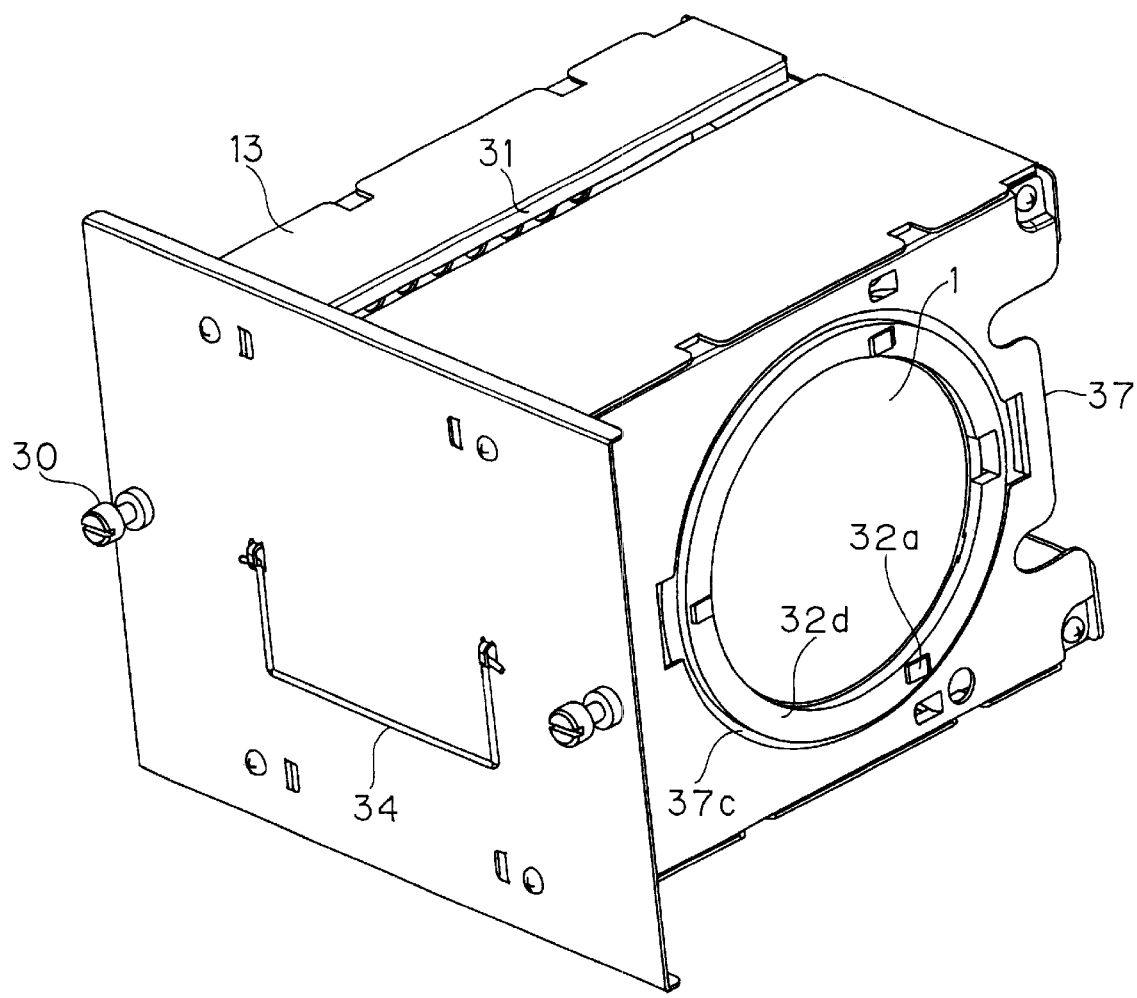
FIG. 10 is a perspective view showing the appearance of the lamp house.

The lamp house 13 will be further described. FIGS. 8 to 10 are perspective views each showing the appearance of the lamp house 13. FIGS. 9 and 10 are views seen from the directions of arrows A81 and A82 in FIG. 8, respectively. As described above, the linear rails 31 are formed on the top and bottom faces of the lamp house 13. The shape in cross section of each of the rails 31 is not limited to that shown in the drawing. Any shapes can be used as long as the guide plates 40 can slide along the rail 31.

The rail 31 is formed in the smooth top face of the lamp house 13. The left side face (left face when it is seen from the front face) of the lamp house 13 is referred to as a left side plate 35 having a number of ventilating holes 35a. When light is emitted from the lamp 1, the cooling fan 50 of the lamp case 14 operates and sends the external air via the ventilating holes 35a into the lamp house 13, thereby cooling the lamp 1. In a manner similar to the left side face, ventilating holes 13a for cooling are opened in the rear plate of the lamp house 13 and, further, ventilating holes for cooling are formed also in the bottom face. The ventilating holes on the rear face and bottom face are used mainly to discharge the air after cooling to the outside.

On the front face of the lamp house 13, a handle 34 and the two mounting screws 30 are provided. The handle 34 is used particularly to draw the lamp house 13 from the lamp case 14. The mounting screws 30 are used to fix the lamp house 13 to the lamp case 14 at the time of fitting by insertion.

On the right side face (right face when it is seen from the front face) of the lamp house 13, the lamp holder 32 is attached in such a manner that a circular projection 32d of the lamp holder 32 is fitted in a hole 37c in the right side plate 37. The attachment of the lamp holder 32 will be described more hereinlater. The three projections 32a are formed on the surface of the circular projection 32d.

To the rear portion of the lamp house 13, the lamp connector 33 is fixed. As described above, the lamp connector 33 is connected to the connector 41 for power supply of the lamp case 14 to thereby supply electric power to the lamp 1.

Figure 11:
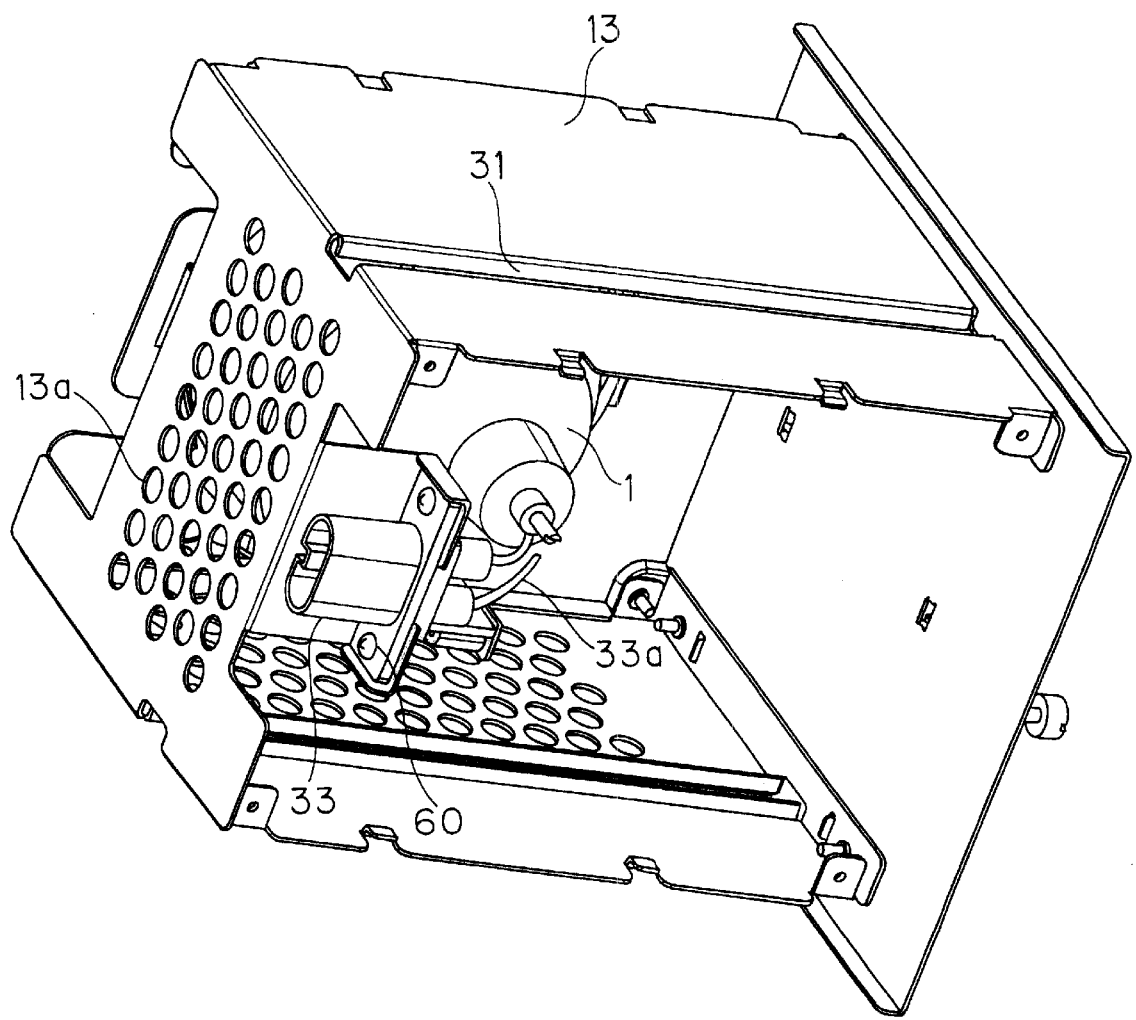
FIG. 11 is a perspective view showing the inside of the lamp house.

FIG. 11 is a perspective view showing the inside of the lamp house 13. The lamp connector 33 is fixed to the lamp house 13 by screws 60. The lamp connector 33 and the lamp 1 are electrically connected via two lead wires 33a.

Figure 12:
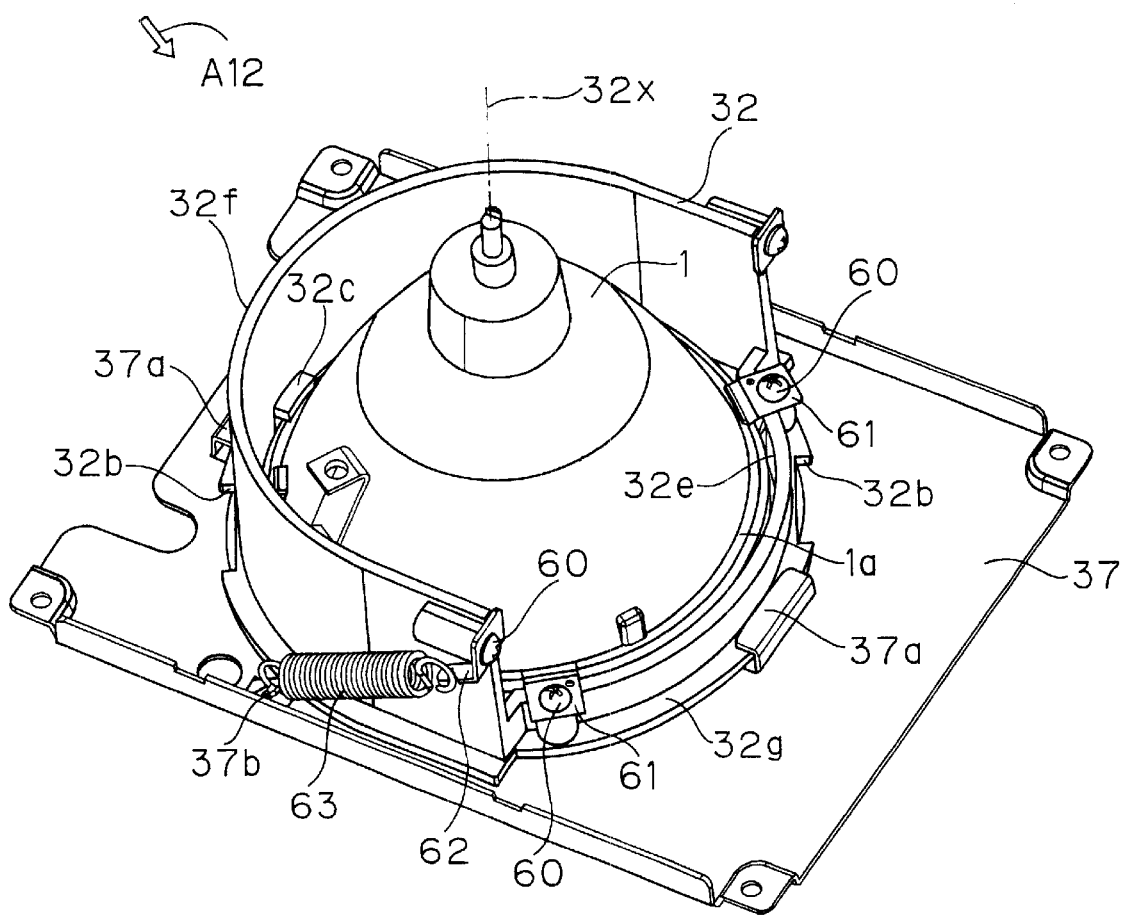
FIG. 12 is a perspective view for explaining a structure of holding a lamp.
Figure 13:
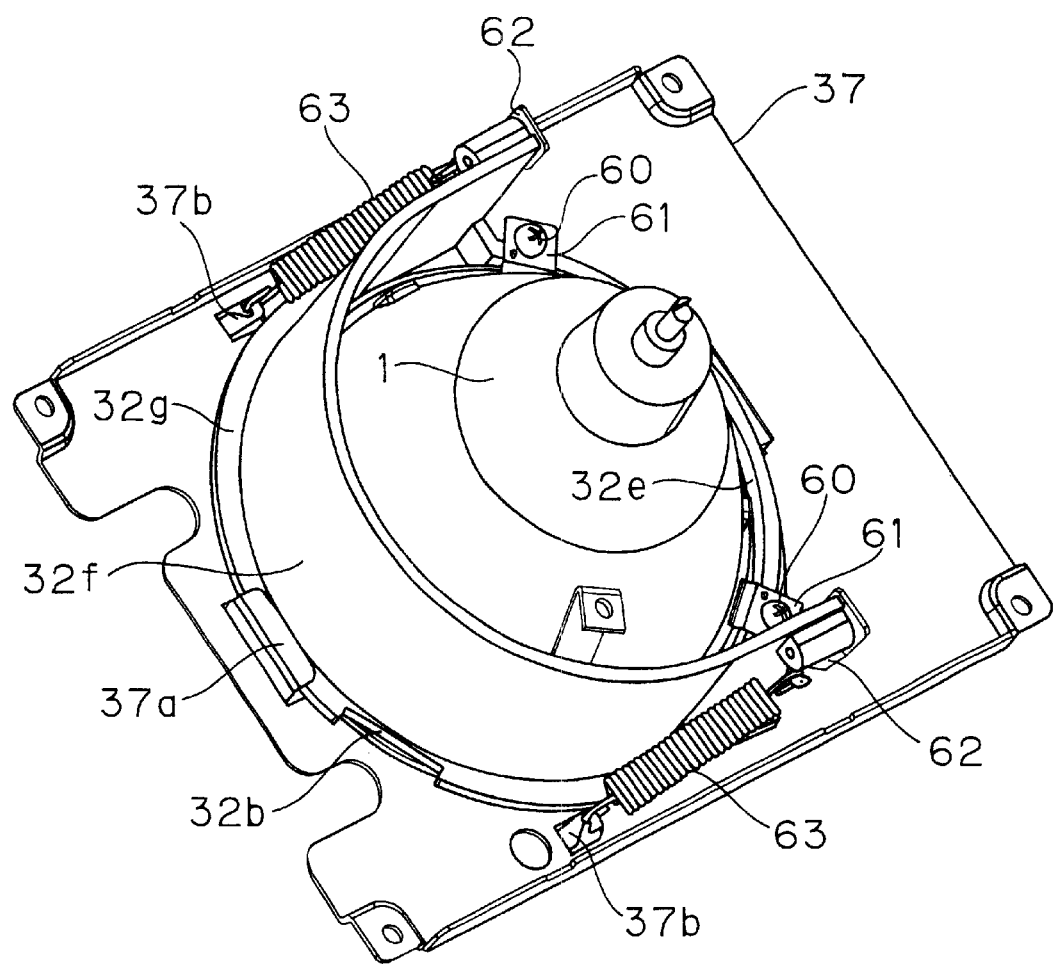
FIG. 13 is a perspective view for explaining the structure of holding the lamp.

The structure of holding the lamp 1 will now be described more specifically. FIGS. 12 and 13 are perspective views for explaining the structure of holding the lamp 1 and show a portion related to the structure of holding the lamp 1, in the lamp house 13. FIG. 13 shows the holding structure when it is seen from the direction of an arrow A12 in FIG. 12. The outline of the structure of holding the lamp 1 is that the lamp holder 32 to which the lamp 1 is fixed is movably attached to the right side plate 37 via an extension spring 63.

The circular light emitting face of the lamp 1 is fitted to the inside of the circular projection 32d of the lamp holder 32 and a circular flange 1a of the lamp 1 is engaged with a rib 32c of the lamp holder 32. The rib 32c is provided in one position on the inside of a circular arc wall face 32f. The other portion of the flange 1a is sandwiched between a bracket 61 and the lamp holder 32 by the screws 60. The flange 1a is sandwiched in two positions by the screws 60. By sandwiching the flange 1a of the lamp 1 via the screws 60 via the bracket 61, the lamp 1 is fixed to the lamp holder 32.

In a state where the lamp 1 is fixed to the lamp holder 32, the circular flange 1a of the lamp 1 is in contact with the inside of the circular arc wall face 32f and a circular arc contact face 32e of the lamp holder 32, thereby making the optical axis of the lamp 1 and the central axis 32x of the circular arc wall face 32f coincide with each other. It is constructed so that a flat face including the three projections 32a is perpendicular to the central axis 32x of the circular arc wall face 32f and is also perpendicular to the optical axis of the lamp 1. The central axis 32x of the circular arc wall face 32f is an axis extending in the center of the circular arc of the circular arc wall face 32f including the portion in a circular arc shape in cross section and is parallel to the circular arc wall face 32f. The central axis of the circular arc contact face 32e is arranged so as to coincide with the central axis 32x of the circular arc wall face 32f.

The lamp holder 32 to which the lamp 1 is fixed is movably attached to the right side plate 37 of the lamp house 13 via the extension spring 63. Specifically, first, two retaining pieces 37a of the right side plate 37 are fitted in two notches 32b formed in the flange 32g formed in the lamp holder 32. At this time, the circular projection 32d of the lamp holder 32 is fitted in the hole 37c in the right side plate 37 (refer to FIG. 10). By turning the lamp holder 32 counterclockwise with respect to the right side plate 37 by a predetermined angle, as shown in FIG. 12, the flange 32g is retained by the retaining pieces 37a.

In the state of FIG. 12, the retaining pieces 37a do not fix the lamp holder 32 to the right side plate 37 but just prevent the lamp holder 32 from coming off from the right side plate 37. That is, the height (which is equal to a gap in which the flange 32g can be fitted) of the retaining piece 37a is larger than the thickness of the flange 32g, and the distance (interval of the portions which are perpendicularly formed on the right side plate 37) between the two retaining pieces 37a is larger than the diameter of the flange 32g. The lamp holder 32 can therefore move a little in both the optical axis direction (direction of the central axis 32x of the circular arc wall face 32f) of the lamp 1 and the direction perpendicular to the optical axis direction with respect to the right side wall 37. The lamp holder 32 is movably disposed in the lamp house 13.

The extension spring 63 is provided in a tensioned state between a hook 62 fixed to the lamp holder 32 by the screw 60 and a hook piece 37b fixed to the right side plate 37. The extension spring 63 is provided in a slightly tensioned state, that is, in a state where a pulling force acts on both ends. The lamp holder 32 is therefore in contact with and pressed against the right side plate 37 by the extension spring 63. As clearly shown in FIG. 13, the extension springs 63 are provided at both ends of the lamp holder 32, so that the lamp holder 32 does not swing by the pulling force of the extension springs 63.

In such a manner, the lamp 1 is fixed to the lamp holder 32 with the optical axis of the lamp 1 coinciding with the central axis 32x of the circular arc wall face 32f, and the lamp holder 32 is movably attached to the right side plate 37 by the two extension springs 63.

Figure 14:
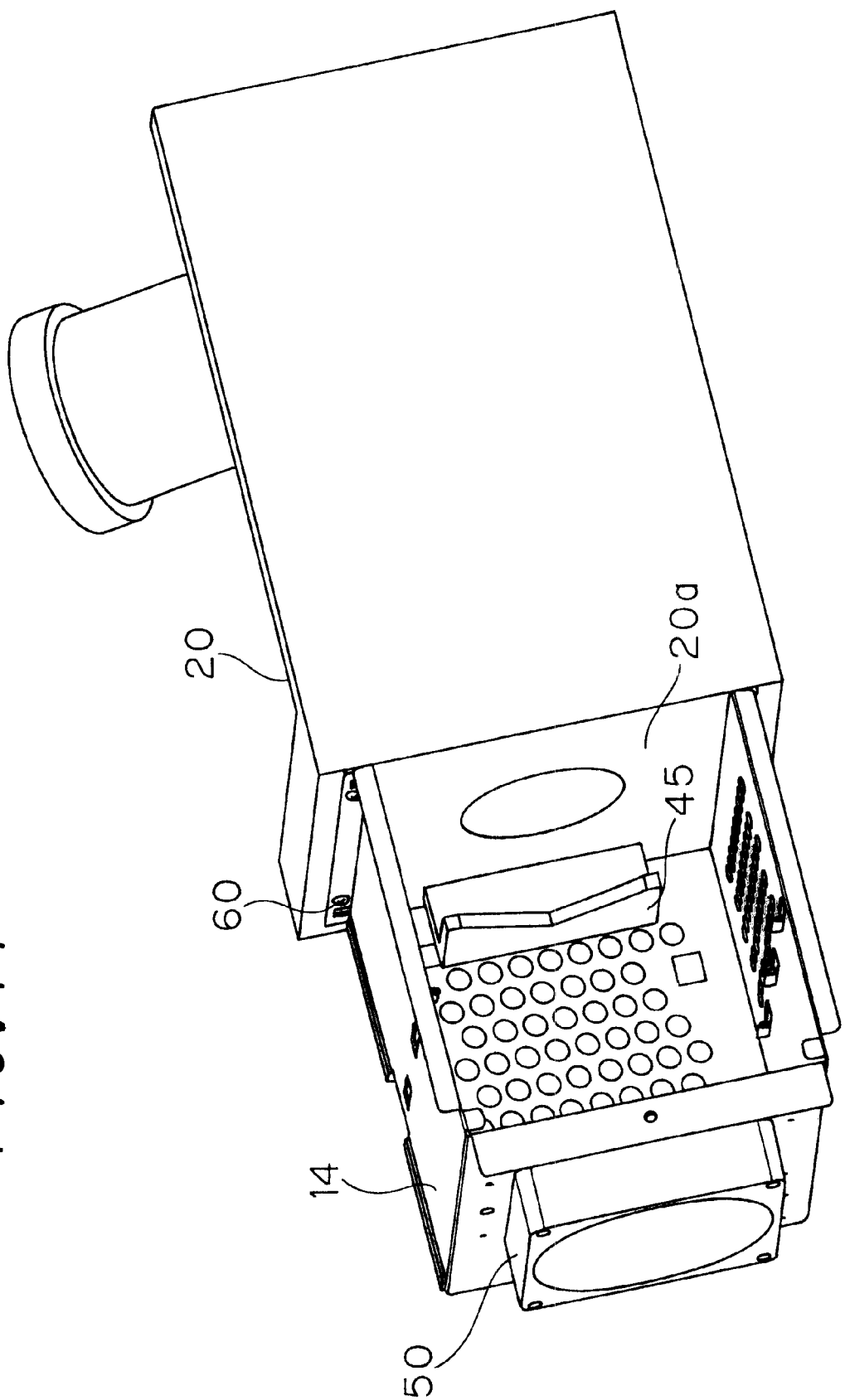
FIG. 14 is a perspective view showing the inside of the lamp case.

A technique for making the optical axis of the lamp 1 coincide with the optical axis of the optical unit when the lamp house 13 is fitted in the lamp case 14 by insertion will now be explained. In the projection display apparatus, as described above, it is important to make the optical axis of the lamp 1 coincide with the optical axis of the optical unit 20 in order to improve the lamp efficiency. FIG. 14 is a perspective view showing the inside of the lamp case 14. The lamp case 14 is fixed to the slide reference face 20a of the optical unit 20 by the screws 60. The slide reference face 20a is a smooth face perpendicular to the optical axis of the optical unit 20. A V-shaped member 45 having a V-shaped wall face is fixed to the slide reference face 20a. It is sufficient to set the angle of the V letter of the V-shaped member 45 within a range from 80° to 160°.

When the lamp house 13 is fitted into such a lamp case 14 by insertion, the center of the lamp 1 is positioned on the optical axis of the optical unit 20 by the circular arc wall face 32f and the V-shaped member 45. The optical axis of the lamp 1 and the optical axis of the optical unit 20 are set to be parallel to each other by the slide reference face 20a and the projection 32a. In such a manner, the optical axis of the lamp 1 and that of the optical unit 20 are made coincide with each other.

Figure 15:
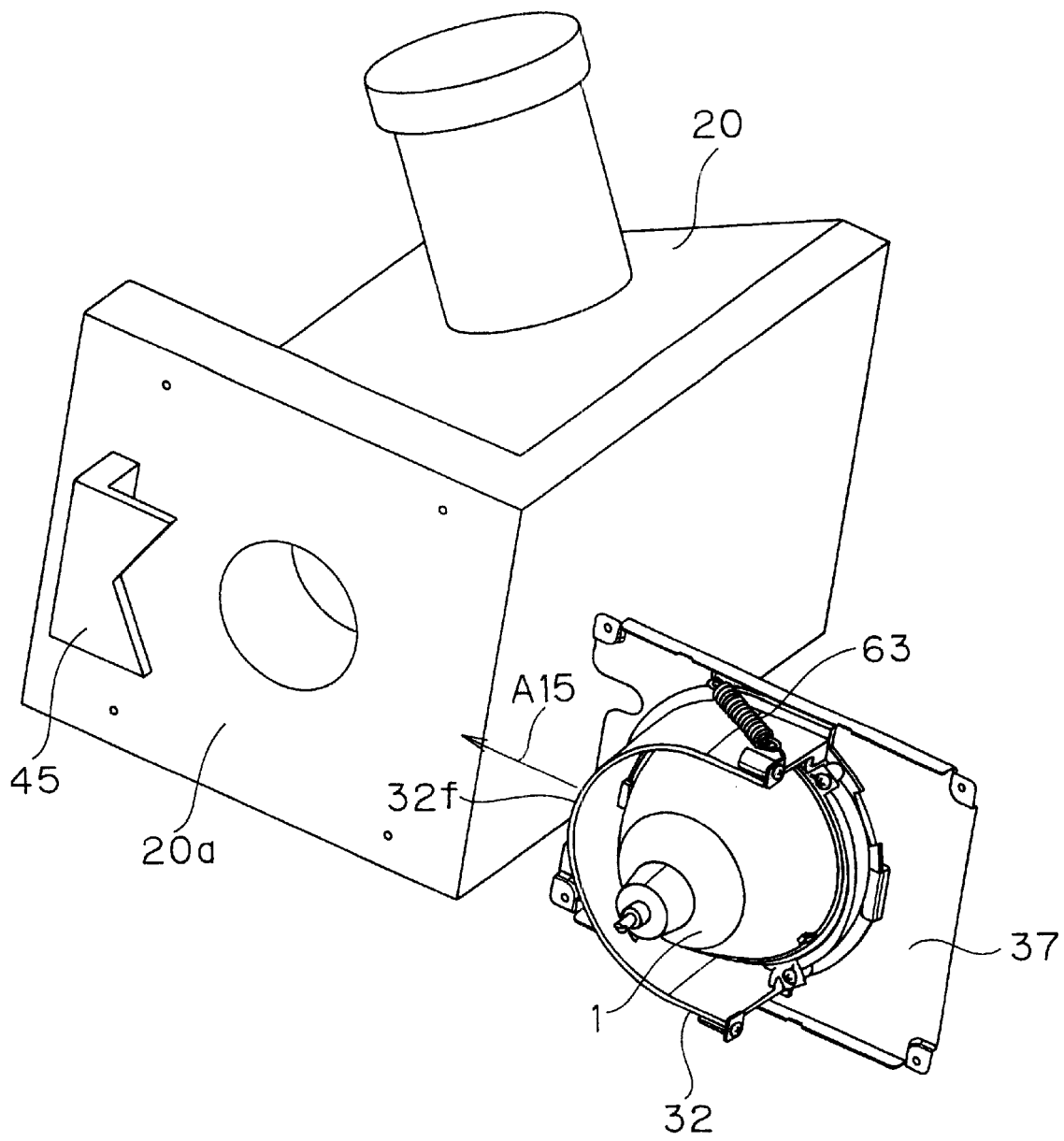
FIG. 15 is a perspective view of a main portion for explaining a state where the lamp house is fitted in the lamp case by insertion.

FIG. 15 is a perspective view of a main portion for explaining a state where the lamp house 13 is fitted into the lamp case 14 by insertion. In the drawing, only the parts related to adjustment of the optical axes are shown for easier understanding. The lamp house 13 including the right side plate 37 is fitted in the direction shown by an arrow AlS in the drawing. At this time, each of the three projections 32a of the lamp holder 32 slidably comes into contact with the slide reference face 20a. The guide plates 40 of the lamp case 14 are fitted in and slides along the rails 31 of the lamp house 13. Then the circular arc wall face 32f of the lamp holder 32 comes into contact with the V-shaped member 45. When the lamp house 13 comes to a predetermined position, the fitting by insertion is completed.

Figure 16:
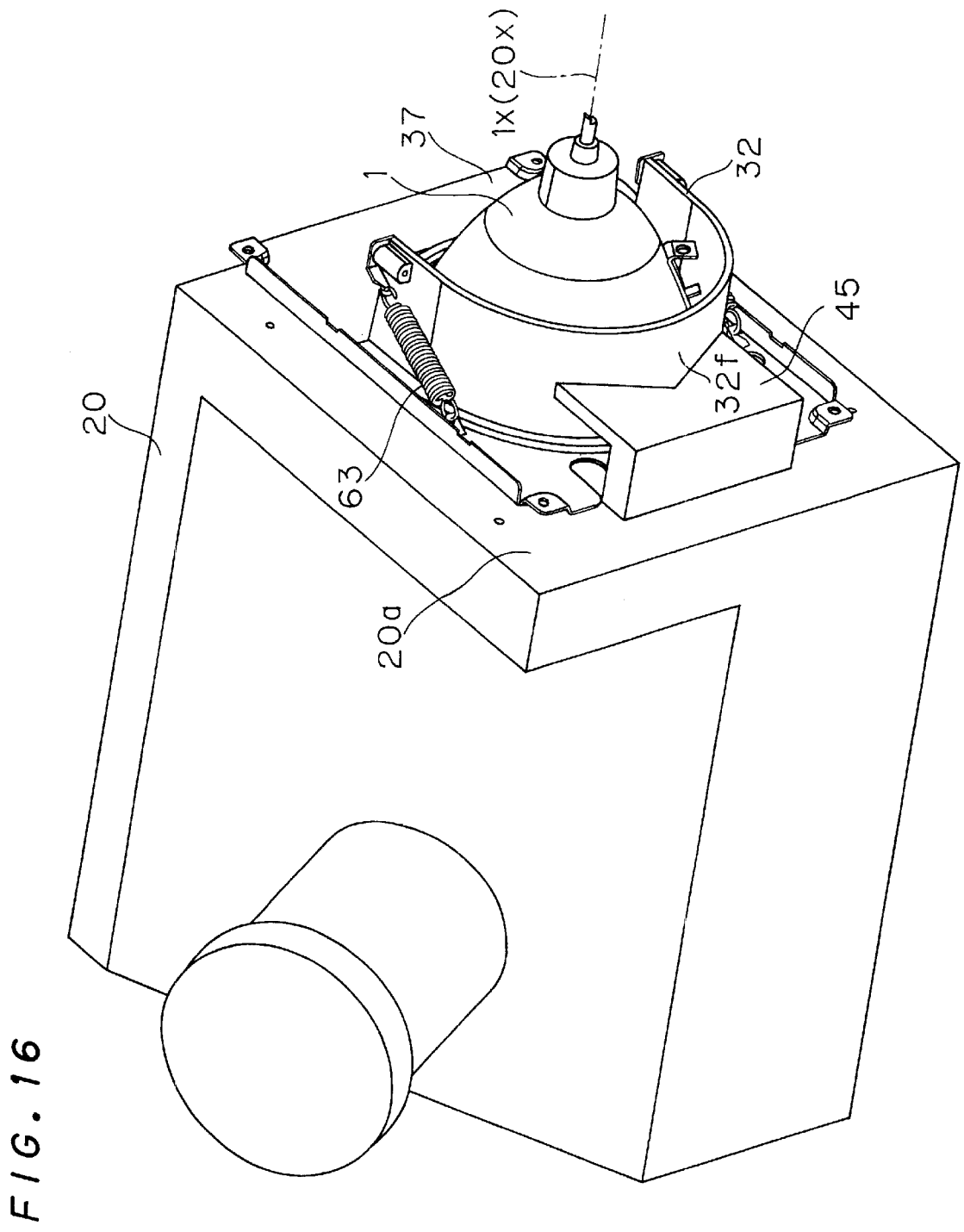
FIG. 16 is a perspective view of the main portion for showing a state where the lamp house is attached to the lamp case.

FIG. 16 is a perspective view of a main portion showing a state where the lamp house 13 is attached to the lamp case 14. In the drawing as well, only the parts related to the adjustment of optical axes are shown for easier understanding. In a state where the lamp house 13 is attached to the lamp case 14, each of the three projections 32a of the lamp holder 32 comes into contact with the slide reference face 20a, and each of the two sides of the V letter of the V-shaped member 45 circumscribes the circular arc wall face 32f of the lamp holder 32. The circular arc wall face 32f of the lamp holder 32 is pressed against the V-shaped member 45 and the three projections 32a are pressed against the slide reference face 20a by the extension spring 63. By those components, the optical axis 1x of the lamp 1 and the optical axis 20x of the optical unit 20 certainly are made coincide with each other.

Figure 17:
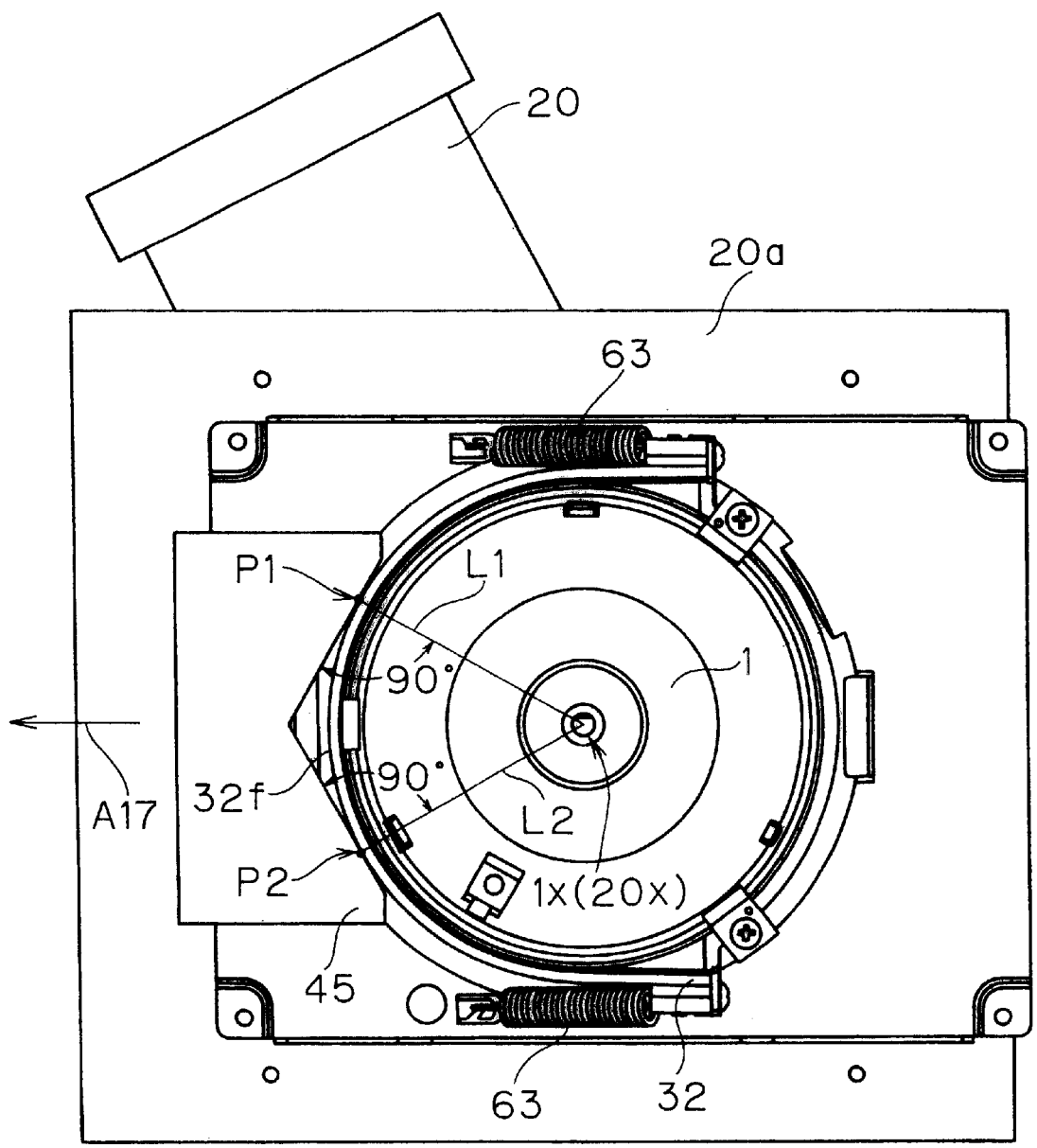
FIG. 17 is a side view for explaining adjustment of the optical axis of the lamp and that of an optical unit.
Figure 18:
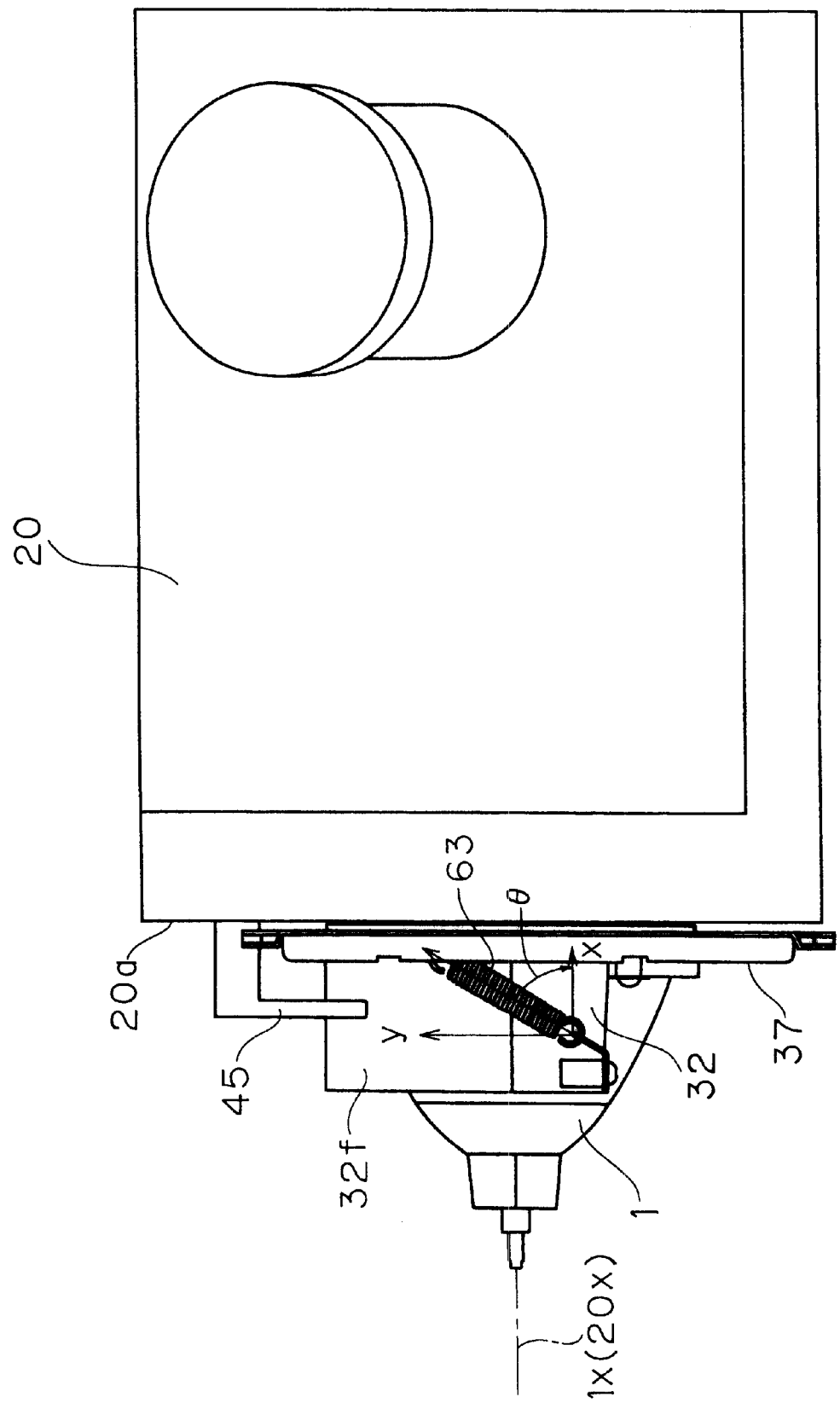
FIG. 18 is a plan view for explaining adjustment of the optical axis of the lamp and that of the optical unit.
Figure 19:
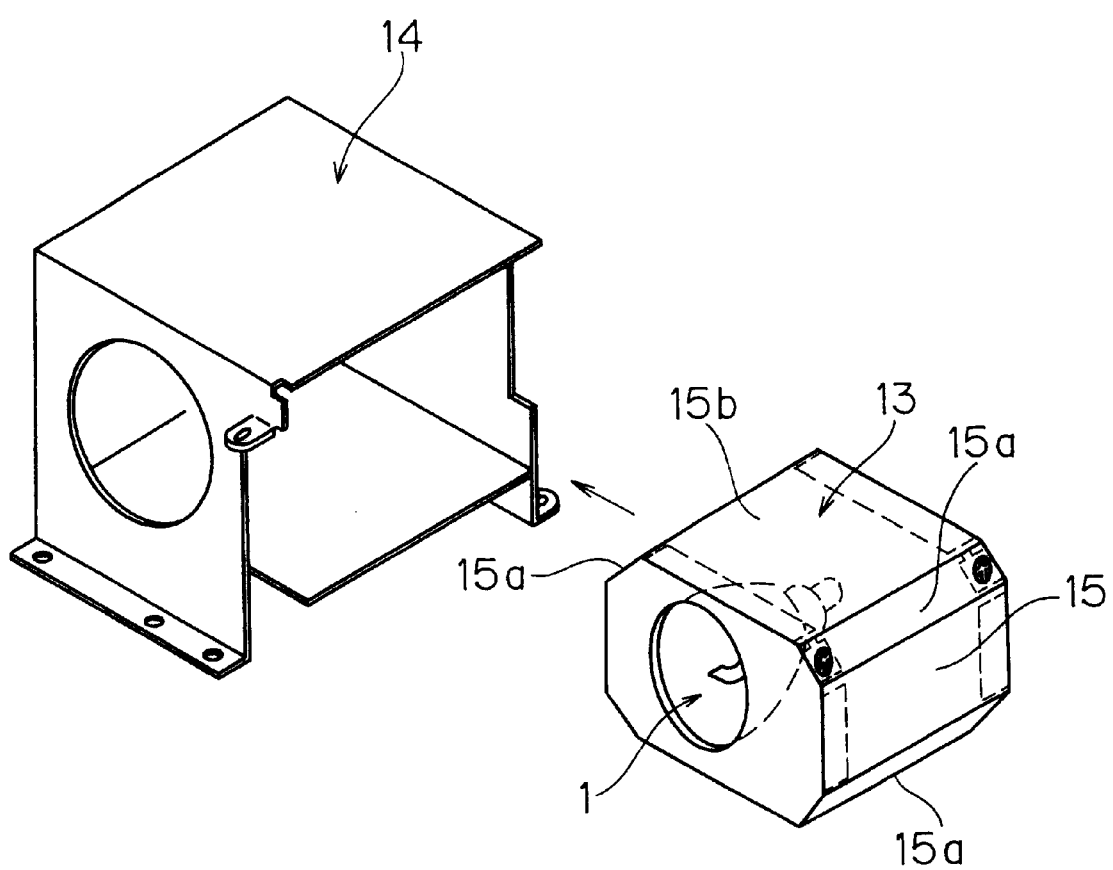
FIG. 19 is a perspective view showing a construction of a part of a conventional projection display apparatus.

FIGS. 17 and 18 are side view and plan view for explaining the adjustment of the optical axes of the lamp 1 and the optical unit 20, respectively. In the drawings as well, only the parts related to the adjustment of the optical axes are shown for easier understanding. The lamp house 13 is inserted in the direction shown by an arrow A17 in FIG. 17. The V-shaped member 45 circumscribes the circular arc wall face 32f of the lamp holder 32 at two contact points P1 and P2. As described above, the lamp holder 32 is not fixed to the right side plate 37 and, therefore, is not fixed to the lamp house 13. The lamp holder 32 is, however, pressed against the V-shaped member 45 by the extension springs 63. Consequently, whenever the lamp house 13 is attached to the lamp case 14, the circular arc wall face 32f is always in contact with the V-shaped member 45. The V-shaped member 45 is fixed to the slide reference face 20a of the optical unit 20 so that a point of intersection of two straight lines L1 and L2 is positioned on the optical axis 20x of the optical unit 20. The two straight lines L1 and L2 pass through the circumscribing points P1 and P2 at which the V-shaped member 45 circumscribes the circular arc wall face 32f and are perpendicular to tangents at the circumscribing points P1 and P2 (that is, the two sides of the V letter of the V-shaped member 45).

The point of intersection of the two straight lines L1 and L2 which pass through the circumscribing points P1 and P2 and are perpendicular to the tangents at the points P1 and P2 is the center of the circular arc in the circular arc wall face 32f including the circular arc shape in cross section and is positioned on the central axis 32x of the circular arc wall face 32f. As described above, the lamp 1 is fixed to the lamp holder 32 so that the optical axis 1x of the lamp 1 extending the center of the lamp 1 and the central axis 32x of the circular arc wall face 32f coincide with each other. Consequently, when the lamp house 13 is attached to the lamp case 14 and the V-shaped member 45 circumscribes the circular arc wall face 32f of the lamp holder 32 at the two contact points P1 and P2, the center of the lamp 1 is positioned on the optical axis 20x of the optical unit 20. That is, the V-shaped member 45 has the function of lamp position regulating means for positioning the center of the lamp 1 onto the optical axis 20x of the optical unit 20 by regulating the position of the lamp holder 32.

On the other hand, since the lamp holder 32 is also pressed against the slide reference face 20a by the extension spring 63, whenever the lamp house 13 is attached to the lamp case 14, each of the three projections 32a is in contact with the slide reference face 20a. The slide reference face 20a is a smooth face perpendicular to the optical axis 20x of the optical unit 20. The lamp 1 is fixed to the lamp holder 32 so that a flat face formed by the three projections 32a is perpendicular to the optical axis 1x of the lamp 1. When the lamp house 13 is attached to the lamp case 14 and the three projections 32a come into contact with the slide reference face 20a, therefore, the flat face formed by the three projections 32a and the slide reference face 20a coincide with each other, and the optical axis 1x of the lamp 1 and the optical axis 20x of the optical unit 20 become parallel to each other. That is, the three projections 32a have the function of lamp posture regulating means for making the optical axis 1x of the lamp 1 and the optical axis 20x of the optical unit 20 parallel to each other by regulating the posture of the lamp holder 32.

As described above, in the projection display apparatus 3 of the preferred embodiment, the position of the lamp 1 is regulated by the circular arc wall face 32f and the V-shaped member 45, and the posture of the lamp 1 is regulated by the slide reference face 20a and the three projections 32a. More specifically, the center of the lamp 1 is positioned on the optical axis 20x of the optical unit 20 by the circular arc wall face 32f and the V-shaped member 45, and the optical axis 1x of the lamp 1 and the optical axis 20x of the optical unit 20 are made parallel to each other by the slide reference face 20a and the three projections 32a. When the center of the lamp 1 is positioned on the optical axis 20x of the optical unit 20 and the optical axis 1x of the lamp 1 and the optical axis 20x of the optical unit 20 are made parallel to each other, the optical axis 1x of the lamp 1 and the optical axis 20x of the optical unit 20 coincide with each other. As a result, light emitted from the lamp 1 can be efficiently distributed to the optical unit 20.

Particularly, in the projection display apparatus 3 of the preferred embodiment, the lamp holder 32 to which the lamp 1 is fixed is movably attached to the right side plate 37, that is, disposed movable with respect to the lamp house 13. Irrespective of the attaching state of the lamp house 13 to the lamp case 14, therefore, only by the position regulation by the circular arc wall face 32f and the V-shaped member 45 and the posture regulation by the slide reference face 20a and the three projections 32a, the optical axis 1x of the lamp 1 and the optical axis 20x of the optical unit 20 can be made coincide with each other. The optical axes can be made coincide with each other by using the small number of parts. It denotes that, when the circular arc wall face 32f, V-shaped member 45, slide reference face 20a and three projections 32a are manufactured with precision, accumulation of dimensional variations in the other components of the lamp house 13 and the lamp case 14 does not exert an influence on the adjustment of the optical axes 1x and 20x. Even if there are dimensional variations within the range of the dimensional tolerance in the circular arc wall face 32f, V-shaped member 45, slide reference face 20a, three projections 32a and the like, since the number of parts is small, the accumulated dimensional variations are much smaller than those of a conventional apparatus. In the projection display apparatus 3 according to the present invention, therefore, irrespective of the dimensional variations of the components of the lamp house 13 and the lamp case 14, the optical axis 1x of the lamp 1 and the optical axis 20x of the optical unit 20 can be easily made coincide with each other.

In the projection display apparatus 3 of the preferred embodiment, the extension spring 63 is provided in a tensioned state between the lamp holder 32 and the right side plate 37. The extension spring 63 acts as a component force for pressing the circular arc wall face 32f of the lamp holder 32 against the V-shaped member 45 and a component force for pressing the three projections 32a against the slide reference face 20a. That is, as shown in FIG. 18, when a pulling force of the extension spring 63 is F, the circular arc wall face 32f is pressed against the V-shaped member 45 with a pressing force of a component force Fy (=Fsinθ) and the three projections 32a are pressed against the slide reference face 20a with a pressing force of a component force Fx (=Fcosθ). The circular arc wall face 32f is therefore always stably in contact with the V-shaped member 45 and the three projections 32a are always stably in contact with the slide reference face 20a. As a result, the center of the lamp 1 is stably positioned on the optical axis 20x of the optical unit 20, the optical axis 1x of the lamp 1 and the optical axis 20x of the optical unit 20 are stably in parallel with each other, and the optical axis 1x of the lamp 1 and the optical axis 20x of the optical unit 20 are certainly made coincide with each other.

Further, since the extension spring 63 is used to press the circular arc wall face 32f and the three projections 32a against the V-shaped member 45 and the slide reference face 20a, respectively, the optical axis 1x of the lamp 1 and the optical axis 20x of the optical unit 20 can be certainly made coincide with each other with the small number of parts.

In the projection display apparatus 3 of the preferred embodiment, in order to properly connect the connector 41 for power supply and the lamp connector 33, by making the guide plates 40 as guiding members provided for the lamp case 14 slide along the rails 31 as members to be guided formed in the lamp house 13, the positioning is performed. That is, the positioning for connecting the connector 41 for power supply and the lamp connector 33 is done by the guide plates 40 fixed to the lamp case 14 and the rails 31 fixedly formed in the lamp house 13. On the other hand, the adjustment of the optical axes of the lamp 1 and the optical unit 20 is done by the contact between the lamp holder 32 and the V-shaped member 45 and the slide reference face 20a. The lamp holder 32 is disposed so as to be movable with respect to the right side plate 37, that is, the lamp house 13.

In other words, the positioning of the connector 41 for power supply and the lamp connector 33 is performed by the mechanism fixed to the lamp house 13. The adjustment of the optical axes of the lamp 1 and the optical unit 20 is performed by the mechanism disposed movably with respect to the lamp house 13. It denotes that the positioning of the connector 41 for power supply and the lamp connector 33 is performed independent of the adjustment of the optical axes of the lamp 1 and the optical unit 20. The connector 41 for power supply and the lamp connector 33 can be therefore easily connected to each other without being influenced by the adjustment of the optical axes of the lamp 1 and the optical unit 20 and it can be prevented that mechanical undue stress is applied to the connectors 41 and 33. On the other hand, the optical axes of the lamp 1 and the optical unit 20 can be easily made coincide with each other without being influenced by the positioning of the connector 41 for power supply and the lamp connector 33, and mechanical stress caused by the connection of the connectors can be prevented from hindering the adjustment of the optical axes. Thus, the optical axis 1x of the lamp 1 and the optical axis 20x of the optical unit 20 can be easily made coincide with each other without being influenced by the positioning mechanism for connecting the connectors.

Although the preferred embodiment of the present invention has been described above, the invention is not limited to the example. For example, although the number of the projections 32a of the lamp holder 32 is three in the foregoing preferred embodiment, the invention is not limited to the number but four or more projections 32a which come into contact with the slide reference face 20a so as to regulate the posture of the lamp holder 32 can be also used. Obviously, the number of the guide plates 40 is not limited to three.

Although the DMD projector having therein the projection display apparatus 3 including the DMD chip 23 has been described as an example in the foregoing preferred embodiment, the technique according to the invention can be also applied to a liquid crystal projector having therein a projection display apparatus 3 including a liquid crystal panel in place of the DMD chip 23, and effects similar to the above can be produced by the technique.

Although the extension spring 63 is used in the preferred embodiment, an elastic member capable of acting as a pulling force such as a rubber member can be used in place of the extension spring 63. Further, instead of the rails 31, a member which is slidably guided by the guide plate 40 may be used.

While the invention has been shown and described in detail, the foregoing description is in all aspects illustrative and not restrictive. It is therefore understood that numerous modifications and variations can be devised without departing from the scope of the invention.

What is claimed is:

1. A projection display apparatus for projecting an enlarged image onto a screen, comprising:

an optical unit having a projection lens for projecting an enlarged image;

a lamp case fixed to said optical unit;

a lamp house in which a lamp holder to which a lamp for distributing light to said optical unit is fixed is movably disposed and which is detachably attached to said lamp case;

a lamp position regulating member which includes at least three projecting members, each of which come into contact with a reference face of said optical unit and regulates a position of said lamp holder when said lamp house is attached to said lamp case, thereby positioning a center of said lamp onto an optical axis of said optical unit; and a lamp posture regulating member that regulates a posture of said lamp holder when said lamp house is attached to said lamp case, thereby making an optical axis of said lamp and said optical axis of said optical unit parallel to each other.

2. The projection display apparatus according to claim 1, wherein said lamp holder has a circular arc wall face having a circular arc shape in cross section, a central axis of said circular arc wall face coinciding with said optical axis of said lamp, said lamp position regulating member is a V-shaped wall face which circumscribes said circular arc wall face at two points when said lamp house is attached to said lamp case, and said V-shaped member is fixed to said optical unit so that a point of intersection of two straight lines which pass through circumscribing points at which said V-shaped member circumscribes said circular arc wall face and are perpendicular to tangential lines at circumscribing points is positioned on said optical axis of said optical unit.

3. The projection display apparatus according to claim 2, wherein said reference face is perpendicular to said optical axis of said optical unit, and said at least three projecting members are fixed to said lamp holder so that a flat face defined by said projecting members is perpendicular to said optical axis of said lamp.

4. The projection display apparatus according to claim 3, further comprising an elastic member for generating a component force for pressing said circular arc wall face against said V-shaped member and a component force for pressing said at least three projecting members against said reference face.

5. The projection display apparatus according to claim 4, wherein a first connector for supplying electric power to said lamp is fixed to said lamp case, a second connector for supplying electric power to said lamp when being connected to said first connector is fixed to said lamp house, and said first and second connectors are connected to each other by making a guided member fixed to said lamp house slide along a guide member fixed to said lamp case.

6. The projection display apparatus according to claim 5, wherein said optical unit has therein a DMD chip and said projection lens enlarges and projects an image from said DMD chip.

7. The projection display apparatus according to claim 5, wherein said optical unit has therein a liquid crystal panel and said projection lens enlarges and projects an image from said liquid crystal panel.

8. A method for positioning a lamp in an optical unit, comprising the steps of:

providing a lamp case, detachably connected to the optical unit, the lamp case having guide plates for guiding a lamp house into a correct position;

providing a detachable lamp house having guide rails for positioning the lamp house within the lamp case by aligning the guide rails with the guide plates;

providing a lamp holder positioned with the lamp house for holding a lamp, the lamp provided for distributing light to the optical unit;

regulating a position of said lamp holder with at least three projecting members, each of which come into contact with a reference face of said optical unit when said lamp house is attached to said lamp case, thereby positioning a center of said lamp onto an optical axis of said optical unit; and regulating a posture of said lamp holder when said lamp house is attached to said lamp case, thereby making an optical axis of said lamp and said optical axis of said optical unit parallel to each other.

9. The method of claim 8, wherein said lamp holder has a circular arc wall face having a circular arc shape in cross section, a central axis of said circular arc wall face coinciding with said optical axis of said lamp, and said regulation of said lamp position is accomplished by a V-shaped member having a V-shaped wall face which circumscribes said circular arc wall face at two points when said lamp house is attached to said lamp case, and said V-shaped member is fixed to said optical unit so that a point of intersection of two straight lines which pass through circumscribing points at which said V-shaped member circumscribes said circular arc wall face and are perpendicular to tangential lines at circumscribing points is positioned on said optical axis of said optical unit.

10. The method of claim 8, wherein said reference face is perpendicular to said optical axis of said optical unit, and said at least three projecting members are fixed to said lamp holder so that a flat face defined by said projecting members is perpendicular to said optical axis of said lamp.

11. The method of claim 10, further comprising an elastic member for generating a component force for pressing said circular arc wall face against a V-shaped member and a component force for pressing said at least three projecting members against said reference face.

12. The method of claim 11, wherein a first connector for supplying electric power to said lamp is fixed to said lamp case, a second connector for supplying electric power to said lamp when being connected to said first connector is fixed to said lamp house, and said first and second connectors are connected to each other by making a guided member fixed to said lamp house slide along a guide member fixed to said lamp case.

* * * * *

UNITED STATES PATENT AND TRADEMARK OFFICE
CERTIFICATE OF CORRECTION

PATENT NO. : 6,508,556 B1
DATED : January 21, 2003
INVENTOR(S) : Ueda, Mitsugu

It is certified that error appears in the above-identified patent and that said Letters Patent is hereby corrected as shown below:

<u>Title page,</u>
Item [73], Assignee, please change the name of the Assignee from "Mitsubishi Denski Kabushiki Kaisha" to -- Mitsubishi Denki Kabushiki Kaisha --

Signed and Sealed this

Fifteenth Day of June, 2004

JON W. DUDAS
*Acting Director of the United States Patent and Trademark Office*